United States Patent
Ueda et al.

(10) Patent No.: US 11,318,862 B2
(45) Date of Patent: May 3, 2022

(54) VEHICLE BATTERY HEATING APPARATUS

(71) Applicant: SUBARU CORPORATION, Tokyo (JP)

(72) Inventors: Hatsuhisa Ueda, Tokyo (JP); Toshiaki Naruke, Tokyo (JP); Norio Suzuki, Tokyo (JP); Takashi Kono, Tokyo (JP); Wataru Nagashima, Tokyo (JP); Kazuya Tachimoto, Tokyo (JP); Kazuki Furuta, Tokyo (JP); Kohei Nanbu, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 113 days.

(21) Appl. No.: 16/675,029

(22) Filed: Nov. 5, 2019

(65) Prior Publication Data
US 2020/0171975 A1    Jun. 4, 2020

(30) Foreign Application Priority Data

Nov. 30, 2018 (JP) .............................. JP2018-224486
Aug. 28, 2019 (JP) .............................. JP2019-156213

(51) Int. Cl.
*B60L 58/27* (2019.01)
*H01M 10/615* (2014.01)
(Continued)

(52) U.S. Cl.
CPC .............. *B60L 58/27* (2019.02); *B60L 58/13* (2019.02); *H01M 10/615* (2015.04);
(Continued)

(58) Field of Classification Search
CPC .... B60L 58/27; B60L 58/13; B60L 2240/545; H01M 10/615; H01M 10/633;
(Continued)

(56) References Cited

U.S. PATENT DOCUMENTS 7,847,522 B2 *  12/2010  Tashiro .............. H01M 10/613
                                                     320/154
9,020,674 B2 *  4/2015   Gregg ................... B60W 20/14
                                                     701/22
(Continued)

FOREIGN PATENT DOCUMENTS

JP          2016-092953 A      5/2016
WO     WO-2014167914 A1 *  10/2014  .......... H01M 10/425

OTHER PUBLICATIONS

Song et al., (Song), Experimental Study on the Effects of Pre-Heating a Battery in a Low-Temperature Environment, 2012 IEEE Vehicle Power and Propulsion Conference, Oct. 9-12, 2012, pp. 1198-1201 (Year: 2012).*

(Continued)

*Primary Examiner* — M Baye Diao
(74) *Attorney, Agent, or Firm* — McGinn I.P. Law Group, PLLC.

(57) ABSTRACT

A vehicle battery heating apparatus is to be mounted in a vehicle that travels with electricity from a battery. The apparatus includes a battery, a heater, a sensor, a controller, and a memory. The battery is mountable in the vehicle to allow the vehicle to travel. The heater heats the battery. The sensor obtains a temperature of the battery. The controller heats the battery with the heater. The memory stores heating target temperatures for respective remaining capacities of the battery. The controller obtains a remaining capacity of the battery, obtains a target temperature from the memory in accordance with the obtained remaining capacity, and sets a target temperature for heating the battery which is not on charge while the vehicle is stopped to the obtained target temperature. The heater heats the battery to the set target temperature.

12 Claims, 12 Drawing Sheets

(51) Int. Cl.
   *H01M 10/633* (2014.01)
   *B60L 58/13* (2019.01)
   *H01M 10/625* (2014.01)

(52) U.S. Cl.
   CPC ....... *H01M 10/625* (2015.04); *H01M 10/633* (2015.04); *B60L 2240/545* (2013.01)

(58) Field of Classification Search
   CPC ........... H01M 10/625; H01M 10/6571; H01M 10/486; H01M 10/4257; H01M 2220/20; H01M 10/637; Y02T 90/16; Y02T 10/70; Y02E 60/10
   USPC ........................................................ 320/150
   See application file for complete search history.

(56) References Cited

U.S. PATENT DOCUMENTS

| | | | | |
|---|---|---|---|---|
| 9,090,162 B2 * | 7/2015 | Brown | .................. | H01M 10/48 |
| 9,796,241 B2 * | 10/2017 | Takeuchi | ................ | B60L 58/26 |
| 10,179,514 B2 * | 1/2019 | Murata | ................. | H01M 10/63 |
| 10,286,808 B2 * | 5/2019 | Park | .................... | H01M 10/615 |
| 10,770,766 B2 * | 9/2020 | Ohgaki | .................... | B60L 58/12 |
| 10,967,748 B2 * | 4/2021 | Ichikawa | ............ | H01M 10/617 |
| 11,097,635 B2 * | 8/2021 | Seo | .................... | B60H 1/00278 |
| 2011/0298427 A1 * | 12/2011 | Uemura | .................. | B60L 50/51 |
| | | | | 320/134 |
| 2016/0126760 A1 | 5/2016 | Murata | | |
| 2017/0347396 A1 * | 11/2017 | Yeung | ...................... | H05B 3/03 |
| 2018/0001774 A1 * | 1/2018 | Murata | .................... | B60L 58/27 |
| 2018/0198173 A1 * | 7/2018 | Ichikawa | ............ | H01M 10/633 |

OTHER PUBLICATIONS

Jeffs et al., (Jeffs), Use of a Thermal Battery with a Heat Pump for Low Temperature Electric Vehicle Operation, Jul. 2017,978-1-5386-1317-7/17/$31.00 ©2017 IEEE (Year: 2017).*

* cited by examiner

TEMPERATURE SELECTION DATA 41

| REMAINING CAPACITY SOC (%) | HEATING START TEMPERATURE (°C) | MODIFIED TARGET TEMPERATURE (°C) |
|---|---|---|
| LESS THAN A% | NOT TO BE HEATED | |
| A% OR MORE | Ta | Tb |

A = VALUE CORRESPONDING TO NORMAL TRAVEL DISTANCE
Ta < Tb

TEMPERATURE SELECTION DATA 51

| REMAINING CAPACITY SOC (%) | HEATING START TEMPERATURE (°C) | MODIFIED TARGET TEMPERATURE (°C) |
|---|---|---|
| LESS THAN A% | NOT TO BE HEATED | |
| A% OR MORE AND LESS THAN B% | Ta | Tb |
| B% OR MORE | Tc | Td |

B = VALUE CORRESPONDING TO LONG TRAVEL DISTANCE
Ta < Tb < Tc < Td

VEHICLE BATTERY HEATING APPARATUS

CROSS-REFERENCE TO RELATED APPLICATIONS

The present application claims priority from Japanese Patent Application No. 2018-224486 filed on Nov. 30, 2018 and Japanese Patent Application No. 2019-156213 filed on Aug. 28, 2019, the entire contents of which are hereby incorporated by reference.

BACKGROUND

The disclosure relates to a vehicle battery heating apparatus.

Batteries are used for vehicles. In particular, high-capacity batteries are mounted on automobiles that travel using electricity.

When a battery is mounted in such a vehicle used outdoors, temperature of the battery decreases while the vehicle is parked and stopped.

The battery is liable to provide lower output as the temperature of the battery decreases.

In view of this, a vehicle used outdoors includes a heater to heat a battery to prevent the battery from being excessively cooled (see Japanese Unexamined Patent Application Publication No. 2016-92953).

However, when the battery is heated by the heater in the vehicle used outdoors, heating consumes a relatively large amount of power.

As a result, when the vehicle is about to travel after starting heating, a capacity remaining in the battery may be insufficient.

Suppose, for example, that while the vehicle is stopped with the battery being not charged by an external power supply, the battery is heated by the heater. In this case, even on an attempt to travel to a destination after that, there is a possibility that power remaining in the battery will not be enough for the vehicle to reach the destination.

In particular, vehicles such as automobiles are different from vehicles such as trains in that basically, a driver or other users do not board a vehicle at regular timings. The vehicles is used at timings in accordance with convenience of users.

For this reason, for users who may board anytime, the vehicle such as an automobile may keep heating the battery constantly while the vehicle is stopped outdoors.

Consequently, when the vehicle is parked or stopped for a long time, for example, the battery may not have enough remaining power to cause the vehicle to travel.

In this manner, there has been a demand for the vehicles such as automobiles used outdoors to appropriately heat the onboard battery and also prevent the remaining capacity of the battery from being lowered by heating by the heater.

SUMMARY

An aspect of the disclosure provides a vehicle battery heating apparatus to be mounted in a vehicle that travels with electricity from a battery, including a battery mountable in the vehicle to allow the vehicle to travel, a heater configured to heat the battery, a sensor configured to obtain a temperature of the battery, a controller configured to heat the battery with the heater, and a memory configured to store heating target temperatures for respective remaining capacities of the battery. The controller is configured to obtain a remaining capacity of the battery, obtain a target temperature from the memory in accordance with the obtained remaining capacity, and set a target temperature for heating the battery which is not on charge while the vehicle is stopped to the obtained target temperature. The heater is configured to heat the battery to the set target temperature.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
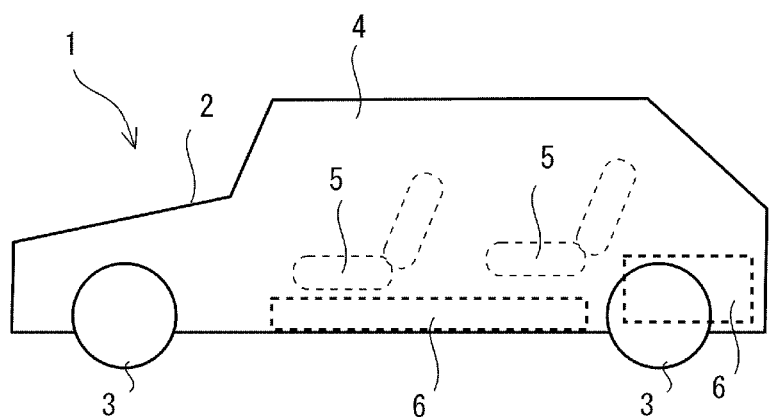
FIG. 1 is a schematic diagram illustrating an automobile as a vehicle to which a battery heating apparatus according to embodiments of the disclosure is applied.

In the following, some embodiments of the disclosure are described in detail with reference to the accompanying drawings. Note that sizes, materials, specific values, and any other factors illustrated in respective embodiments are illustrative for easier understanding of the disclosure, and are not intended to limit the scope of the disclosure unless otherwise specifically stated. Further, elements in the following example embodiments which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

First Embodiment

FIG. 1 is a schematic diagram illustrating an automobile 1 as a vehicle to which a battery heating apparatus 10 according to the embodiments of the disclosure is applied.

With a user aboard, the automobile 1 travels using electricity of a battery. The automobile 1 is an example of the vehicle. Other examples of the vehicle include large-sized vehicles, motorcycles, personal mobilities, bicycles, railroad vehicles, airplanes, and boats. The vehicle may travel to a destination in accordance with operation by the user as a driver or by self-driving.

The automobile 1 in FIG. 1 includes a vehicle body 2, wheels 3 at the front and rear of the vehicle body 2, and seats 5 disposed in a vehicle cabin 4 of the vehicle body 2. The driver and other users are seated on the seats 5.

The automobile 1 also includes battery modules 6 at the bottom of the vehicle body 2. In FIG. 1, the battery modules 6 are mounted under a floor below the seats 5 in the vehicle cabin 4 and at the rear of the vehicle cabin 4. The battery modules 6 may be detachably mounted in the vehicle body 2.

Basically, the automobile 1 travels outdoors. The automobile 1 is parked or stopped outdoors.

When the battery modules 6 including high-capacity lithium ion batteries are mounted in the automobile 1 thus used outdoors, the batteries may decrease in temperature while the automobile 1 is parked or stopped.

Lithium ion batteries are liable to provide lower output as a temperature of the battery decreases.

In the automobile 1 used outdoors, therefore, batteries are desirably heated by a heater to prevent the batteries from being excessively cooled.

However, when the batteries are heated by the heater in the automobile 1 used outdoors, heating consumes a relatively large amount of power.

As a result, when the automobile 1 is about to travel after starting heating, capacities remaining in the batteries may be insufficient.

Suppose, for example, that while the automobile 1 is stopped with the batteries being not charged by an external power supply, the batteries are heated by the heater. In this case, even on an attempt to travel to a destination after that, there is a possibility that the remaining capacities of the batteries will not be enough for the automobile 1 to reach the destination.

In particular, different from vehicles such as trains, the automobile 1 is intended to travel at a timing when the driver or other users board the automobile 1. The automobile 1 does not necessarily travel in predetermined time zones or predetermined distances, for example. The automobile 1 is used in accordance with convenience of users.

For this reason, for users who may board anytime, the automobile 1 may keep heating the batteries constantly while stopped outdoors.

Consequently, when the automobile 1 is parked or stopped for a long time without being charged, for example, no power to cause the automobile 1 to travel may be left in the batteries.

In this manner, there has been a demand for the automobile 1 used outdoors to appropriately heat the onboard batteries and also to prevent the remaining capacities of the batteries from being lowered by heating by the heater.

Figure 2:
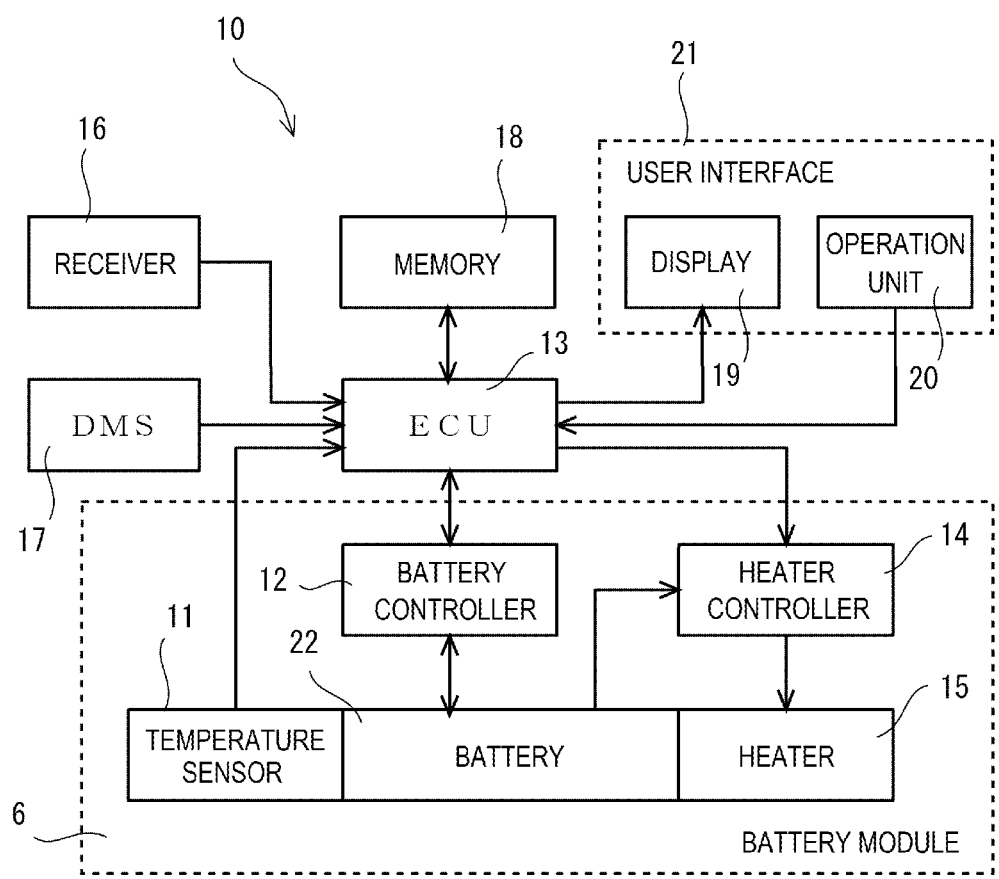
FIG. 2 is a diagram illustrating a configuration of the battery heating apparatus mounted in the automobile in FIG. 1.

FIG. 2 is a diagram illustrating a configuration of the battery heating apparatus 10 mounted in the automobile 1 in FIG. 1.

The battery heating apparatus 10 in FIG. 2 includes a temperature sensor 11, a battery controller 12, an electronic control unit (ECU) 13, a heater controller 14, a heater 15, a receiver 16, an occupant monitoring device (DMS) 17, a memory 18, a display 19, and an operation unit 20. The display 19 and the operation unit 20 function as a user interface 21 in the vehicle cabin 4.

In FIG. 2, the temperature sensor 11, the battery controller 12, the heater controller 14, and the heater 15 in addition to the battery 22 are disposed in each of the battery modules 6. The other components of the battery heating apparatus 10, namely, the ECU 13, the receiver 16, the occupant monitoring device 17, the memory 18, the display 19, and the operation unit 20 are disposed in the vehicle body 2.

The temperature sensor 11 detects a temperature of the battery 22. In detecting the temperature of the battery 22, the temperature sensor 11 may be disposed in the battery module 6 containing the battery 22. The battery heating apparatus 10 may further include a temperature sensor to detect, for example, an external temperature other than the temperature of the battery 22.

The battery controller 12 obtains, for example, an output power of the battery 22, an input power regenerated and returned to the battery 22, and other states of the battery 22 in a real-time basis. The battery controller 12 may be coupled to the temperature sensor 11 to obtain the temperature of the battery 22.

Based on the detection information thus obtained, the battery controller 12 monitors a condition of the battery 22.

For example, the battery controller 12 calculates a state of charge (SOC) representing a remaining capacity of the battery 22. The battery controller 12 functions as a remaining capacity sensor to calculate the remaining capacity of the battery 22.

The battery controller 12 monitors changes in the output power over time and determines a state of health (SOH) representing a degradation state of an output capacity of the battery 22.

The battery controller 12 monitors changes in the input power over time and determines an SOH representing a degradation state of an input capacity of the battery 22. In this case, the battery controller 12 functions as a degradation sensor to determine degradation states of the output capacity and the input capacity of the battery 22.

The heater 15 heats the battery 22. The heater 15 to heat the battery 22 may be disposed in the battery module 6 containing the battery 22.

The heater controller 14 controls heating of the battery 22 by the heater 15.

Under control by the ECU 13, the heater controller 14 starts heating by the heater 15.

Under control by the ECU 13, the heater controller 14 ends heating by the heater 15. The battery 22 is heated in a period of time from a start to an end of heating by the heater 15.

The receiver 16 receives, for example, GPS satellite radio waves and performs data communication with base stations.

Upon receipt of the GPS satellite radio waves, the receiver 16 generates information on a current location of the automobile 1 based on the GPS satellite radio waves. In this case, the receiver 16 functions as a current location detector to detect the current location of the automobile 1.

The receiver 16 in data communication with a base station transmits host vehicle information including the current location of the automobile 1 to the base station and receives traffic information regarding movements or other factors of other movable bodies from the base station.

For example, the receiver 16 receives from the base station information on road surfaces of a route on which the automobile 1 is planned to travel.

The occupant monitoring device 17 identifies and monitors a user that has boarded the automobile 1.

The display 19 is disposed in the vehicle cabin 4 and displays various kinds of information to the user. The display 19 displays, for example, a check screen as to whether to heat the battery 22.

Along with the display 19, the operation unit 20 is disposed in the vehicle cabin 4 and operated by the user. The operation unit 20 receives, for example, a user's operation as to whether to heat the battery 22.

The memory 18 stores programs and data used by the ECU 13.

For example, the memory 18 accumulates and stores a travel history of the automobile 1 for each user. The travel history of each user includes, for example, a history of the output power of the battery 22 and a history of the input power of the battery 22 during traveling of the automobile 1.

The memory 18 may further store, for example, a charging history including position information on past charging sites.

The ECU 13 is a computer mounted in the automobile 1. The ECU 13 reads and executes the programs stored in the memory 18. This provides a controller for the automobile 1, to comprehensively control traveling of the automobile 1.

The ECU 13 as the controller controls, for example, heating of the battery 22 by the heater 15.

Figures 3, 4:
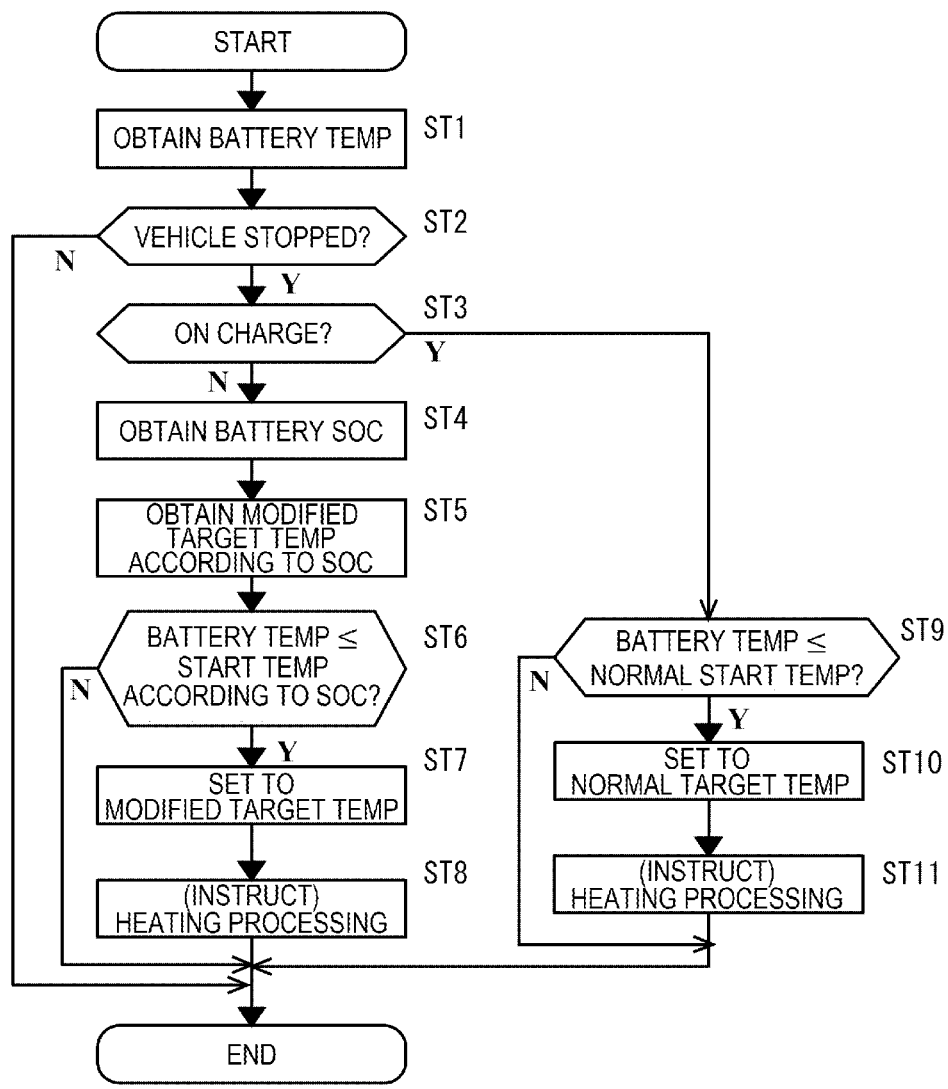
FIG. 3 illustrates temperature selection data of target temperatures stored in a memory in FIG. 2 according to a first embodiment.
FIG. 4 is a flowchart of a procedure for heating control of a battery performed by an ECU in FIG. 2 according to the first embodiment.

FIG. 3 illustrates temperature selection data 41 of target temperatures stored in the memory 18 in FIG. 2 according to a first embodiment.

The temperature selection data 41 in FIG. 3 is table data including a plurality of records for respective modified target temperatures.

Each of the records includes values of items, namely, an SOC range, a heating start temperature, and a modified target temperature as a heating target temperature.

FIG. 3 illustrate an example in which the temperature selection data 41 includes two records. Alternatively, the temperature selection data 41 may include three or more records.

For example, the record in the first row of FIG. 3 includes values, namely, a state of charge (SOC) of "Less than A %", "Not to be heated", and "Not to be heated" in sequence. As used herein, A % as a threshold of the remaining capacity is simply set, for example, at such a value as to enable the automobile 1 to travel a normal travel distance with a minimum output.

Different from the record in the first row of FIG. 3, a modified target temperature may be set as the heating target temperature of the record in the first row. In this case, the modified target temperature is simply set at such a temperature as to provide an output capacity and an input capacity for the battery 22 that enable the automobile 1 to implement at least minimum traveling in an operation region of the automobile 1 using the onboard battery 22. The minimum traveling is simply presumed, for example, traveling in the neighborhood within the city limits that can be implemented by the SOC.

Different from the record in the first row of FIG. 3, a heating start temperature may be set. In this case, the heating start temperature is simply set, for example, at such a minimum temperature as to provide a minimum output capacity and a minimum input capacity of the onboard battery 22 in the operation region of the automobile 1.

The record in the second row of FIG. 3 includes values, namely, an SOC of "A % or more", a heating start temperature of "Ta" degrees, and a modified target temperature of "Tb" degrees in sequence (Tb>Ta).

A modified target temperature as the heating target temperature of the record in the second row is simply set, for example, at such a temperature as to provide an output capacity and an input capacity of the battery 22 which enable the automobile 1 to implement at least normal traveling in the operation region of the automobile 1 using the onboard battery 22. The normal traveling is simply presumed, for example, traveling beyond the city limits.

The heating start temperature is simply set, for example, at such a minimum temperature as to provide a standard output capacity and a standard input capacity of the onboard battery 22 in the operation region of the automobile 1.

The ECU 13 operates in accordance with the temperature selection data 41. For example, when the SOC is A % or more and the temperature of the battery 22 is Ta degrees or less, the ECU 13 performs heating control of the battery 22 to heat the battery 22 to Tb degrees.

When the SOC is less than A % that enables the automobile 1 to travel a normal distance, the ECU 13 does not perform the heating control of the battery 22 irrespective of the temperature of the battery 22.

FIG. 4 is a flowchart of a procedure for heating control of the battery 22 performed by the ECU 13 in FIG. 2 according to the first embodiment.

The ECU 13 repeatedly performs the heating control of the battery 22 illustrated in FIG. 4. For example, in a cycle in accordance with external temperature irrespective of operation of the automobile 1, the ECU 13 may repeat the heating control of the battery 22 illustrated in FIG. 4. In place of the ECU 13, the battery controller 12 may repeatedly perform the heating control of the battery 22 illustrated in FIG. 4.

At step ST1 in FIG. 4, the ECU 13 obtains a current temperature of the battery 22. From the temperature sensor 11, for example, the ECU 13 obtains the temperature of the battery 22.

At step ST2, the ECU 13 determines whether the automobile 1 is stopped. In accordance with, for example, information obtained from a vehicle speed sensor, not illustrated, and information, from the occupant monitoring device 17, as to whether the automobile 1 is boarded, the ECU 13 determines whether the automobile 1 is stopped. For example, when the vehicle speed sensor indicates a speed of 0, the ECU 13 determines that the automobile 1 is stopped. When the vehicle speed sensor indicates other speeds, the ECU 13 determines that the automobile 1 is not stopped. For example, when there is no user aboard, the ECU 13 determines that the automobile 1 is stopped. When there is even one user aboard, the ECU 13 determines that the automobile 1 is not stopped. When the automobile 1 is stopped, the ECU 13 makes processing proceed to step ST3. When the automobile 1 is not stopped, the ECU 13 ends the processing in FIG. 4.

At step ST3, the ECU 13 determines whether the battery 22 is on charge. For example, based on a detection result as to whether a plug is coupled to the charging outlet, not illustrated, of the automobile 1, the ECU 13 determines whether the battery 22 is on charge. For example, when the plug is not coupled to the charging outlet, the ECU 13 determines that the battery 22 is not on charge. When the plug is coupled to the charging outlet, the ECU 13 determines that the battery 22 is on charge. When the battery 22 is not on charge, the ECU 13 makes the processing proceed to step ST4. When the determination in step ST3 is affirmative, that is, when the battery 22 is on charge, the ECU 13 makes the processing proceed to step ST9.

At step ST9, the ECU 13 determines whether the current temperature of the battery 22 is equal to or lower than a normal heating start temperature. The normal heating start temperature may be fixedly set at a value corresponding to the battery 22 in accordance with the operation region of the automobile 1, for example. The normal start temperature is simply set, for example, at such a temperature as to provide an output capacity and an input capacity of the battery 22 that enable the automobile 1 to implement standard traveling. When the current temperature of the battery 22 is cooled to a value equal to or lower than the normal start temperature, the ECU 13 makes the processing proceed to step ST10. When the current temperature of the battery 22 is not cooled to a value equal to or lower than the normal start temperature, the ECU 13 ends the processing in FIG. 4.

At step ST10, the ECU 13 sets the target temperature of the heating control of the battery 22 to a normal target temperature. The normal target temperature is simply set at such a temperature as to provide an output capacity and an input capacity of the battery 22 that enable the automobile 1 to implement standard traveling or a predetermined temperature equal to or more than this temperature.

At step ST11, the ECU 13 heats the battery 22. The ECU 13 instructs the heater controller 14 to heat the battery 22. The heater controller 14 heats the battery 22 using the heater 15.

The ECU 13 periodically obtains a temperature of the battery 22 being heated and determines whether the temperature of the battery 22 being heated has reached the normal target temperature. When the temperature of the battery 22 being heated has reached the normal target temperature, the ECU 13 instructs the heater controller 14 to stop heating the battery 22. Thereafter, the ECU 13 ends the processing in FIG. 4.

Thus, the ECU 13 can heat the battery 22 of the automobile 1 which is on charge while the automobile 1 is stopped, to the normal target temperature. When the battery 22 is on charge, the ECU 13 heats the battery 22 to enable the automobile 1 to implement the standard traveling irrespective of the SOC as remaining power in the battery 22.

At step ST4, the ECU 13 obtains the SOC indicating the current remaining capacity of the battery 22 which is not on charge. The ECU 13 obtains the SOC from the battery controller 12.

At step ST5, the ECU 13 obtains data such as a modified target temperature corresponding to the obtained SOC. Based on the temperature selection data 41 in FIG. 3, the ECU 13 obtains a value of a heating start temperature corresponding to the current SOC and a modified target temperature as a heating target temperature.

At step ST6, the ECU 13 determines whether the current temperature of the battery 22 is equal to or lower than the heating start temperature in accordance with the SOC obtained along with the modified target temperature. When the current temperature of the battery 22 is cooled to a value equal to or lower than the heating start temperature, the ECU 13 makes the processing proceed to step ST7. When the current temperature of the battery 22 is not cooled to a value equal to or lower than the heating start temperature, the ECU 13 ends the processing in FIG. 4.

At step ST7, the ECU 13 sets the target temperature of heating control of the battery 22 to the obtained modified target temperature.

At step ST8, the ECU 13 heats the battery 22. The ECU 13 instructs the heater controller 14 to heat the battery 22. The heater controller 14 heats the battery 22 using the heater 15.

The ECU 13 periodically obtains a temperature of the battery 22 being heated and determines whether the temperature of the battery 22 being heated has reached the modified target temperature. When the temperature of the battery 22 being heated has reached the modified target temperature, the ECU 13 instructs the heater controller 14 to stop heating the battery 22. Thereafter, the ECU 13 ends the processing in FIG. 4.

Thus, in accordance with the obtained remaining capacity of the battery 22, the ECU 13 can set the target temperature for heating the battery 22 which is not on charge while the automobile 1 is stopped.

For example, when the SOC indicating the remaining capacity of the battery 22 is less than A % that enables the automobile 1 to travel the normal distance, the ECU 13 can perform control not to heat the battery 22 of the automobile 1 which is not on charge while the automobile 1 is stopped.

When the SOC indicating the remaining capacity of the battery 22 is equal to or more than A % that enables the automobile 1 to travel the normal distance, the ECU 13 heats the battery 22 of the automobile 1 which is not on charge while the automobile 1 is stopped, to the modified target temperature.

As described above, according to this embodiment, the ECU 13 obtains the current remaining capacity of the battery 22 disposed in the automobile 1 to enable the automobile 1 to travel. Then, the ECU 13 sets, in accordance with the obtained remaining capacity, the modified target temperature for heating the battery 22 which is not on charge while the automobile 1 is stopped. For example, when the obtained remaining capacity is lower than A % as a first remaining capacity that enables the automobile 1 to travel the normal distance, the ECU 13 does not heat the battery 22 using the heater 15. Consequently, according to this embodiment, when the current remaining capacity of the battery 22 is low, consumption of power from the battery 22 can be reduced.

As a result, according to this embodiment, in the vehicle such as the automobile 1, the onboard battery 22 is appropriately heated. Also, when the current remaining capacity of the battery 22 is low, the remaining capacity can be prevented from being decreased by heating by the heater 15.

This embodiment, for example, prevents the remaining power in the battery 22 from becoming insufficient for the vehicle to travel to a destination, and also prevents the vehicle from being disabled to travel due to long-term heating that lowers the remaining capacity of the battery 22.

When the obtained remaining capacity is less than A % that enables the automobile 1 to travel the normal distance, the ECU 13 may set the target temperature of the heating control of the battery 22 to a modified target temperature lower than the modified target temperature when the SOC is equal to or more than A %, instead of controlling not to heat the battery 22. In this case as well, according to this embodiment, consumption of the power from the battery 22 having a low remaining capacity can be reduced. Also, this embodiment prevents the vehicle from being disabled to travel.

Second Embodiment

Next, the battery heating apparatus 10 of the automobile 1 according to a second embodiment of the disclosure will be described. According to this embodiment, even while the battery 22 is on charge, a modified target temperature is obtained from the memory 18 and used.

In this embodiment, the same reference signs are used for configurations similar to those in the above-described embodiment, and illustration and description thereof will be omitted. The following description will focus on differences from the above-described embodiment.

Figures 5, 6:
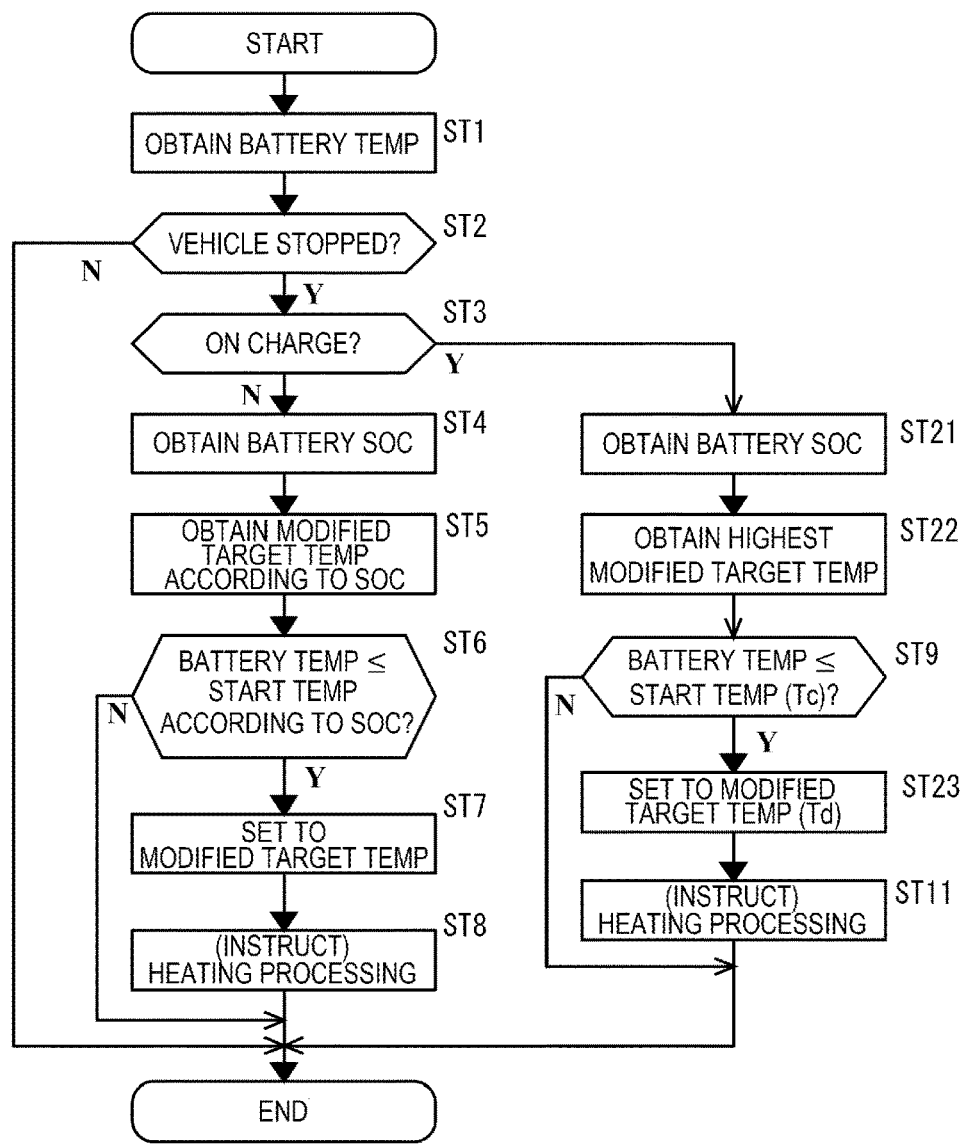
FIG. 5 illustrates temperature selection data of target temperatures stored in the memory in FIG. 2 according to a second embodiment.
FIG. 6 is a flowchart of a procedure for heating control of the battery performed by the ECU in FIG. 2 according to the second embodiment.

FIG. 5 illustrates temperature selection data 51 of target temperatures stored in the memory 18 in FIG. 2 according to the second embodiment.

The temperature selection data 51 in FIG. 5 is table data including a plurality of records for respective modified target temperatures.

In FIG. 5, the record in the first row includes values of an SOC range, a heating start temperature, and a modified target temperature as a heating target temperature in sequence, that is, "Less than A %", "Not to be heated", and "Not to be heated". A % is a SOC threshold that enables the automobile 1 to travel the normal distance with the minimum output.

The record in the second row includes values in sequence, that is, "A % or more and less than B %", "Ta" degrees, and "Tb" degrees. A % is the SOC threshold, and B % is another SOC threshold.

The record in the third row includes values in sequence, that is, "B % or more", "Tc" degrees, and "Td" degrees. Tc>Tb and Td>Tc. As used herein, the SOC threshold B % is higher than the threshold A % and is simply set, for example, at such a value as to enable the automobile 1 to travel a longer distance with a normal output than that in the case of A %.

The modified target temperature, as the heating target temperature, of the record in the third row is simply set, for example, at such a temperature as to provide an output capacity and an input capacity of the battery 22 that enable the automobile 1 to implement at least traveling with a higher output using the onboard battery 22 in the operation region of the automobile 1, that than in a normal case.

The heating start temperature is simply set, for example, at such a minimum temperature as to provide a higher output capacity and a higher input capacity of the onboard battery 22 in the operation region of the automobile 1 than a standard output capacity and a standard input capacity.

In accordance with the temperature selection data 51, when the SOC is B % or more (B % enables long-distance traveling) and the temperature of the battery 22 becomes Tc degrees or less, the ECU 13 performs heating control of the battery 22 to heat the battery 22 to Td degrees.

In this case, A % that enables the normal-distance traveling is referred to as the first remaining capacity, and B % is referred to as a second remaining capacity.

FIG. 6 is a flowchart of a procedure for heating control of the battery 22 repeatedly performed by the ECU 13 in FIG. 2 according to the second embodiment in a similar manner to the first embodiment.

While the automobile 1 is stopped and the battery 22 is not on charge, the ECU 13 obtains a modified target temperature corresponding to the obtained SOC at step ST5. Based on the temperature selection data 51 in FIG. 5, the ECU 13 obtains a value of the heating start temperature corresponding to the current SOC and a modified target temperature as the heating target temperature.

Thereafter, based on the heating start temperature and the modified target temperature thus obtained, the ECU 13 performs processing from step ST6 to step ST8.

Consequently, when the SOC is B % or more, the ECU 13 heats the battery 22 so as to provide a higher output capacity and a higher input capacity than the standard output capacity and the standard input capacity.

While the automobile 1 is stopped and the battery 22 is on charge, the ECU 13 obtains a modified target temperature for heating the battery 22 to the highest level at step ST22. From the temperature selection data 51 in FIG. 5, irrespective of the current SOC, the ECU 13 obtains a value of the heating start temperature to heat the battery 22 to the highest level in the temperature selection data 51, and the modified target temperature, as the heating target temperature, for heating the battery 22 to the highest level. In the case of FIG. 5, the heating start temperature is "Tc", and the heating target temperature is "Td".

At step ST9, the ECU 13 determines whether the current temperature of the battery 22 is equal to or lower than the obtained heating start temperature (Tc). When the current temperature of the battery 22 is cooled to a value equal to or lower than the heating start temperature, the ECU 13 makes processing proceed to step ST23. When the current temperature of the battery 22 is not cooled to a value equal to or lower than the heating start temperature, the ECU 13 ends the processing in FIG. 6.

At step ST23, the ECU 13 sets a target temperature of the heating control of the battery 22 to the obtained highest modified target temperature (Td).

At step ST11, the ECU 13 heats the battery 22. The ECU 13 instructs the heater controller 14 to heat the battery 22. The heater controller 14 heats the battery 22 using the heater 15.

The ECU 13 periodically obtains a temperature of the battery 22 and determines whether the temperature of the battery 22 being heated has reached the modified target temperature. When the temperature of the battery 22 being heated has reached the modified target temperature, the ECU 13 instructs the heater controller 14 to stop heating the battery 22. Thereafter, the ECU 13 ends the processing in FIG. 6.

Thus, the ECU 13 can heat the battery 22 of the automobile 1 which is on charge while the automobile 1 is stopped to the highest modified target temperature. While the battery 22 is on charge, the ECU 13 heats the battery 22 to enable highest-level traveling irrespective of the SOC as remaining power in the battery 22.

Thus, when the obtained SOC is higher than B % that enables the long-distance traveling, the ECU 13 obtains a modified target temperature higher than a target temperature in the case of the SOC less than B % and sets the target temperature of the heating control of the battery 22 to the obtained modified target temperature.

Then, in accordance with the obtained remaining capacity, the ECU 13 can obtain and set the heating target temperature for heating the battery 22 which is on charge while the automobile 1 is stopped.

As a result, in actual charging, the SOC increases as time elapses. Even when heating causes a decrease in the SOC, the SOC becomes 100% after a time elapse. Finally, the SOC becomes 100%, and the battery 22 is heated to such a temperature as to provide a higher output capacity and a higher input capacity than the standard output capacity and the standard input capacity.

As described above, according to this embodiment, when the obtained SOC is higher than B % that enables the long-distance traveling, the ECU 13 obtains the modified target temperature higher than that in the case of the SOC less than B % and sets the target temperature of the heating control of the battery 22 to the obtained modified target temperature.

Consequently, according to this embodiment, when the battery 22 has sufficient remaining power, for example, the temperature of the battery 22 is made higher than the normal target temperature to improve an output characteristic of the battery 22 as compared with that in a normal case.

Thus, this embodiment improves performance of the automobile 1 traveling with output power from the battery 22.

Third Embodiment

Next, the battery heating apparatus 10 of the automobile 1 according to a third embodiment of the disclosure will be described. This embodiment uses a modified target temperature in accordance with degradation of the battery 22.

In this embodiment, the same reference signs are used for configurations similar to those in the above-described embodiments, and illustration and description thereof will be omitted. The following description will focus on differences from the above-described embodiments.

Figure 7:
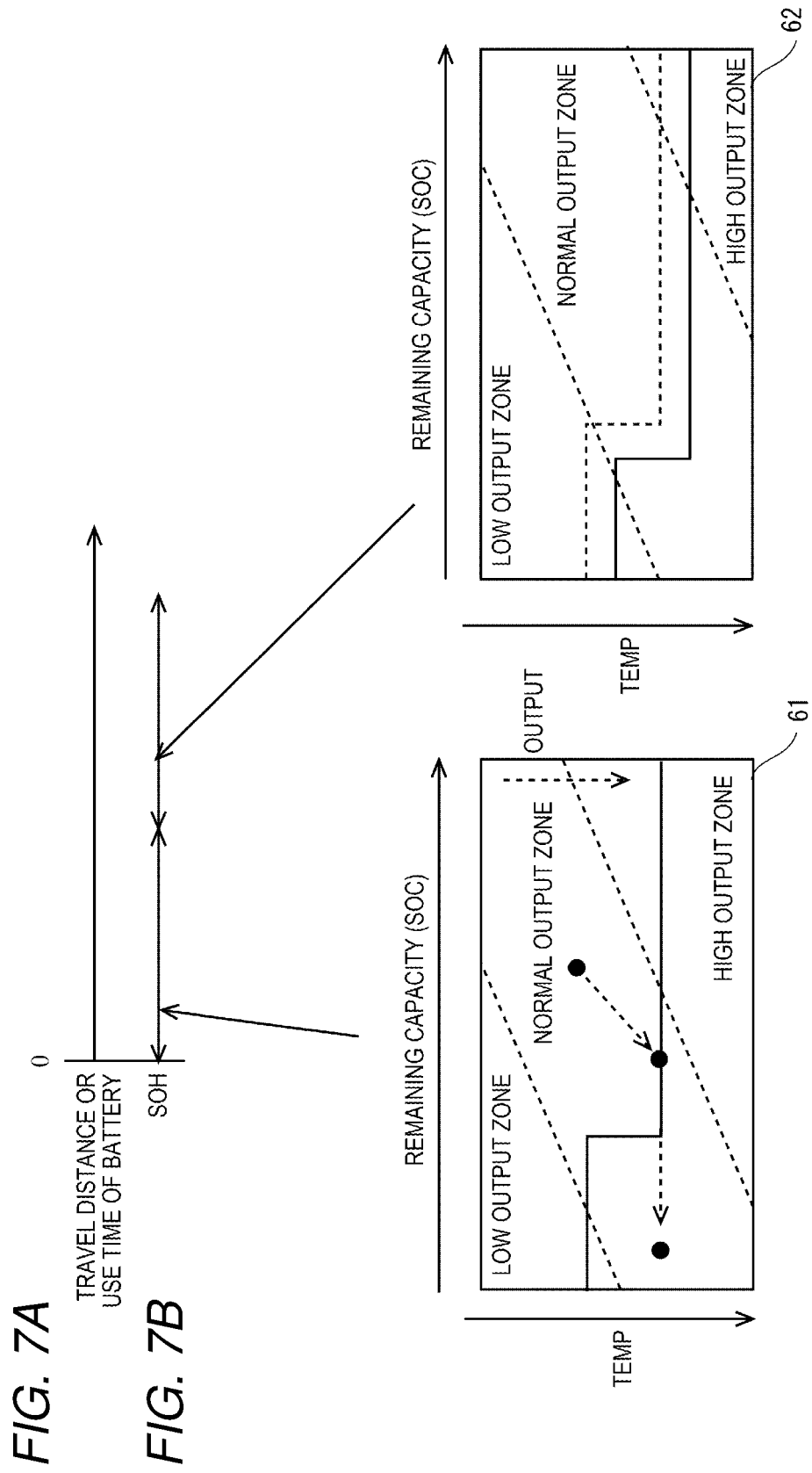
FIGS. 7A and 7B illustrate a plurality of sets of temperature selection data of target temperatures stored in the memory in FIG. 2 according to a third embodiment.

FIGS. 7A and 7B illustrates a plurality of sets of temperature selection data 61 and 62 of target temperatures stored in the memory 18 in FIG. 2 according to the third embodiment.

FIG. 7A illustrates a timeline depicting an accumulated travel distance or use time of the battery 22. FIG. 7B illustrates an SOH of the battery 22. The SOH is degraded and decreased in accordance with the accumulated travel distance or use time. FIG. 7B illustrates a first SOH period immediately after a start of using the battery 22 and a second SOH period that follows. As used herein, the SOH represents a degradation state of the battery 22.

A lower area of FIG. 7B illustrates the first temperature selection data 61 used in the first SOH period and the second temperature selection data 62 used in the second SOH period on corresponding graphs of output capacities of the battery 22.

The first temperature selection data 61 is used, for example, when the accumulated travel distance or use time of the battery 22 is less than a threshold. That is, the first temperature selection data 61 is used when the SOH of the battery 22 is excellent.

The second temperature selection data 62 is used, for example, when the accumulated travel distance or use time of the battery 22 is equal to or longer than the threshold. That is, the second temperature selection data 62 is used when the battery 22 is degraded and the SOH of the battery 22 is not excellent.

The memory 18 stores the first temperature selection data 61, the second temperature selection data 62, and the threshold of the travel distance or use time for switching from the first temperature selection data 61 to the second temperature selection data 62.

In each of the output capacity graphs of the battery 22, the vertical axis represents temperature. The temperature increases from the top to the bottom of each graph.

The horizontal axis of each graph represents an SOC as a remaining capacity. The SOC increases from the left to the right of each graph.

The output capacity of the battery 22 decreases as the SOC decreases and as the temperature decreases. In view of this, the output capacity of the battery 22 may be classified, for example, into zones defined by dotted lines in the graph, that is, a low output zone, a normal output zone, and a high output zone.

The first temperature selection data 61 in the left graph of FIG. 7B basically includes one modified target temperature corresponding to each SOC value. A plurality of modified target temperatures corresponding to respective SOC values are indicated with a solid line in the left graph of FIG. 7B. In the left graph of FIG. 7B, the solid line connecting the plurality of modified target temperatures is a polygonal chain having two levels. The boundary between the two levels is located at a predetermined relatively low SOC value. In this case, the plurality of modified target temperatures include a constant low modified target temperature in a low SOC range of low remaining capacities and a constant high modified target temperature in a high SOC range of high remaining capacities. Actually, the first temperature selection data 61 simply includes the low SOC range, a low modified target temperature corresponding to the low SOC range, the high SOC range, and a high modified target temperature corresponding to the high SOC range. The same applies to the second temperature selection data 62 in the right graph of FIG. 7B. As used herein, an SOC threshold on the boundary between the low SOC range and the high SOC range where the modified target temperature changes as indicated with the graph of the first temperature selection data 61 may be substantially the same as the above-described threshold A %, for example.

The output capacity of a new battery 22 illustrated in the left graph of FIG. 7B is overall higher than that of an old battery 22 illustrated in the right graph of FIG. 7B. That is, the output capacity of the battery 22 is wholly degraded and decreased as the accumulated travel distance or use time of the battery 22 increases.

Consequently, as indicated with the solid line in the output capacity graph of the old battery 22 illustrated as the second temperature selection data 62 in the right of FIG. 7B, the modified target temperatures in the second temperature selection data 62 are higher than those indicated with the dashed line in the same graph. The dashed line in the output capacity graph in the right of FIG. 7B indicates the modified target temperatures indicated with the solid line in the graph of the first temperature selection data 61 in the left of FIG. 7B. The modified target temperatures of the degraded old battery 22 are made higher to make the battery 22 that has been degraded and decreased in output capacity have substantially the same output capacity as the battery 22 that has not been degraded. An SOC threshold on the boundary between a low SOC range and a high SOC range where the modified target temperature changes as indicated with the graph of the second temperature selection data 62 is simply made lower than the threshold in the graph of the first temperature selection data 61. This makes it easier for the battery 22 that has been degraded and decreased in output capacity to have substantially the same output capacity as the battery 22 that has not been degraded even in the case of an SOC close to the threshold.

The ECU 13 compares the accumulated travel distance or use time of the battery 22 with the threshold and selects one of the first temperature selection data 61 and the second temperature selection data 62.

When the accumulated travel distance or use time of the battery 22 is less than the threshold, the ECU 13 selects the first temperature selection data 61 and selects a modified target temperature from the first temperature selection data 61.

When the accumulated travel distance or use time of the battery 22 is equal to or longer than the threshold, the ECU 13 selects the second temperature selection data 62 and selects a modified target temperature from the second temperature selection data 62.

Thus, when the battery 22 is degraded, the ECU 13 obtains a modified target temperature higher than that when the battery 22 is not degraded, and sets the target temperature of the heating control of the battery 22 to the obtained modified target temperature.

Figure 8:
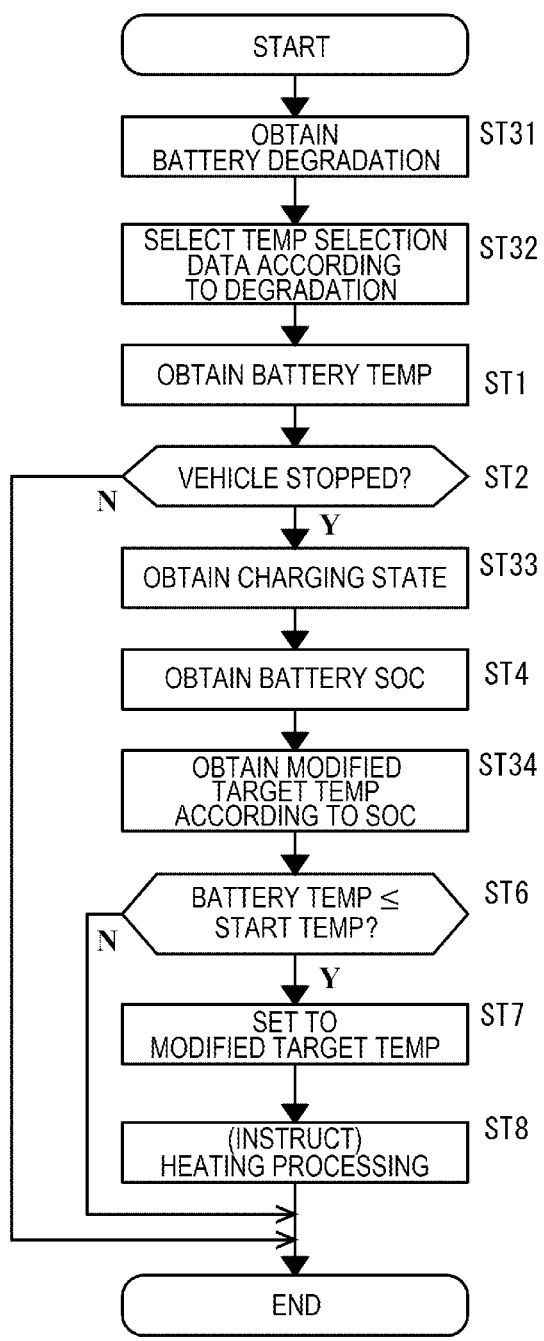
FIG. 8 is a flowchart of a procedure for heating control of the battery performed by the ECU in FIG. 2 according to the third embodiment.

FIG. 8 is a flowchart of a procedure for heating control of the battery 22 repeatedly performed by the ECU 13 in FIG. 2 according to the third embodiment in a similar manner to the first embodiment.

At step ST31, the ECU 13 obtains a degradation state of a current output capacity of the battery 22. For example, the ECU 13 obtains an SOH from the battery controller 12. The ECU 13 may obtain, for example, a value of an odometer indicating an accumulated distance traveled by the automobile 1.

At step ST32, based on the obtained degradation state of the battery 22, the ECU 13 selects one of the plurality of sets of temperature selection data 61 and 62 in accordance with FIGS. 7A and 7B.

Thereafter, the ECU 13 obtains a charging state of the battery 22 (for example, either one of "on charge" and "not on charge") at step ST33, and obtains an SOC at step ST4.

At step ST34, the ECU 13 uses the selected temperature selection data 61 or 62 to obtain a modified target temperature corresponding to the obtained SOC. For example, when a degradation level of the battery 22 is relatively low, the ECU 13 obtains a modified target temperature corresponding to the obtained SOC based on the graph of the first temperature selection data 61 in the left of FIG. 7B irrespective of the charging state. Alternatively, for example, when the battery 22 is on charge, the ECU 13 may obtain the highest modified target temperature in the high output zone of the first temperature selection data 61 in the left graph of FIG. 7B in a different manner from the case in which the battery 22 is not on charge.

Thereafter, the ECU 13 sets the target temperature of the battery 22 to the modified target temperature at step ST7, and performs heating control of the battery 22 at step ST8. In this case, a heating start temperature compared with the current temperature of the battery 22 at step ST6 may be a fixed value irrespective of the SOC or the modified target temperature. Alternatively, the heating start temperature compared with the current temperature of the battery 22 at step ST6 may be a different value for each modified target temperature that is selected in accordance with the SOC as in the above-described embodiments. The heating start temperature may be a temperature lower than the modified target temperature by a fixed allowable temperature difference.

Thus, the ECU 13 can obtain the modified target temperature for heating the battery 22 which is not on charge while the automobile 1 is stopped, for example, in accordance with the obtained remaining capacity and the degradation level of the battery 22, and sets the target temperature of the heating control of the battery 22 to the obtained modified target temperature.

When the battery 22 is degraded, the ECU 13 can obtain a modified target temperature higher than that when the battery 22 is not degraded, and set the target temperature of the heating control of the battery 22 to the obtained modified target temperature.

As described above, according to this embodiment, the battery controller 12 determines a degradation state (SOH) of the output capacity of the battery 22. The battery controller 12 is an example of a degradation sensor. Then, the ECU 13 obtains a current degradation state (SOH) of the output capacity of the battery 22, and when the battery 22 is degraded, the ECU 13 obtains a modified target temperature higher than that when the battery 22 is not degraded and sets the target temperature of the heating control of the battery 22 to the obtained modified target temperature.

Consequently, according to this embodiment, when the battery 22 is degraded, the battery 22 is heated to a temperature higher than that when the battery 22 is not degraded, so as to prevent the output capacity of the degraded battery 22 from decreasing and to improve the output capacity of the degraded battery 22.

As a result, according to this embodiment, the output capacity of the battery 22 is less likely to be affected by degradation of the battery 22. Even when the battery 22 is degraded, the automobile 1 can travel with substantially the same output capacity as when the battery 22 is not degraded.

Fourth Embodiment

Next, the battery heating apparatus 10 of the automobile 1 according to a fourth embodiment of the disclosure will be described. This embodiment uses a modified target temperature in accordance with a travel history of the automobile 1.

In this embodiment, the same reference signs are used for configurations similar to those in the above-described embodiments, and illustration and description thereof will be omitted. The following description will focus on differences from the above-described embodiments.

Figure 9A:
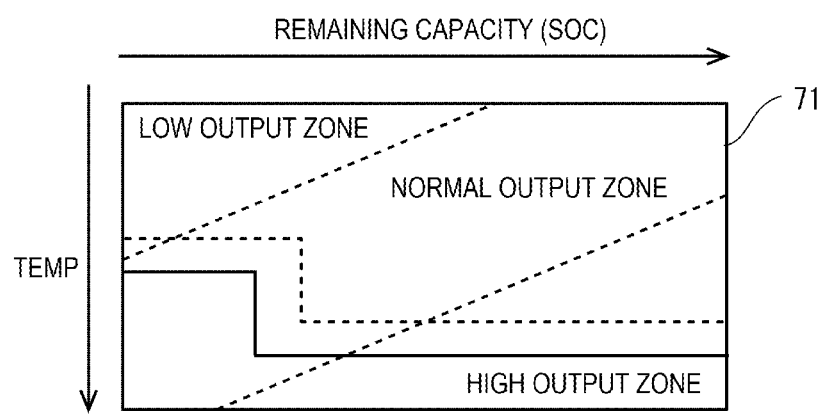
FIGS. 9A and 9B illustrate temperature selection data of target temperatures stored in the memory in FIG. 2 according to a fourth embodiment or a fifth embodiment.
Figure 9B:
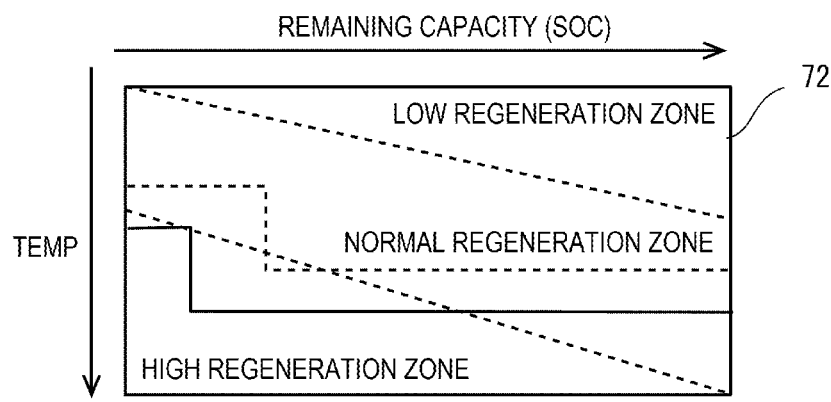

FIGS. 9A and 9B respectively illustrate temperature selection data 71 and 72 of target temperatures stored in the memory 18 in FIG. 2 according to the fourth embodiment.

FIG. 9A illustrates the temperature selection data 71 of target temperatures according to the fourth embodiment.

FIG. 9A illustrates the temperature selection data 71 on a graph of output capacities of the battery 22.

The temperature selection data 71 basically includes two modified target temperatures for each SOC value, that is, a modified target temperature for high output and a modified target temperature for normal output. A plurality of modified target temperatures for high output corresponding to respective SOC values are indicated with a solid line in FIG. 9A. A plurality of modified target temperatures for normal output corresponding to respective SOC values are indicated with a dashed line in FIG. 9A. Each of the lines connecting the plurality of modified target temperatures is a polygonal chain having two levels. The boundary between the two levels is located on a predetermined relatively low SOC value. An SOC threshold on the boundary between a low SOC range and a high SOC range where the modified target temperature changes as indicated with each of the solid line graph and the dashed line graph is simply made lower than the threshold in the graph of the first temperature selection data 61. This makes it easier for the battery 22 that is degraded and decreased in output capacity to have substantially the same output capacity as the battery 22 that is not degraded. The SOC threshold on the boundary between the low SOC range and the high SOC range where the modified target temperature changes as indicated with the dashed line graph of the temperature selection data 71 may be substantially the same as the above-described threshold A %, for example. In this case, the SOC threshold on the boundary between the low SOC range and the high SOC range where the modified target temperature changes as indicated with the solid line graph of the temperature selection data 71 may be made lower than the SOC threshold in the dashed line graph. This facilitates providing a higher output.

The modified target temperatures of the temperature selection data 71 for high output indicated with the solid line in FIG. 9A are higher than the modified target temperatures of the temperature selection data 71 for normal output indicated with the dashed line. The temperature selection data 71 includes a plurality of sets of modified target temperatures corresponding to a plurality of output capacities.

When an average output of the battery 22 during vehicle traveling is high, the ECU 13 selects a higher modified target temperature indicated with the solid line in place of a modified target temperature indicated with the dashed line.

Thus, when the automobile 1 is traveling with a high output, the ECU 13 can obtain a modified target temperature higher than that when the automobile 1 is traveling with a normal low output and sets the target temperature of the heating control of the battery 22 to the obtained modified target temperature.

Figure 10:
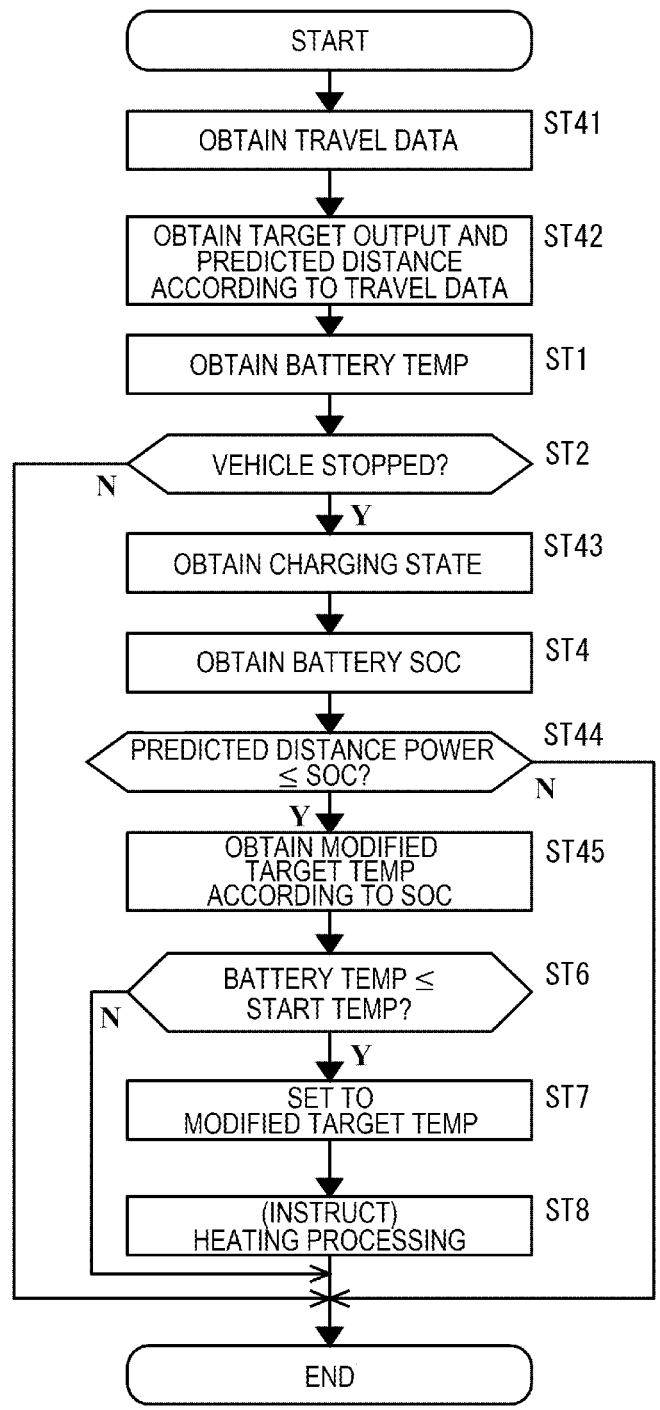
FIG. 10 is a flowchart of a procedure for heating control of the battery performed by the ECU in FIG. 2 according to the fourth embodiment or the fifth embodiment.

FIG. 10 is a flowchart of a procedure for heating control of the battery 22 performed by the ECU 13 in FIG. 2 according to the fourth embodiment.

At step ST41, the ECU 13 obtains travel data of the automobile 1 as a travel history of the automobile 1. The travel data of the automobile 1 includes, for example, a history, such as a travel distance by the automobile 1, a traveling speed, and an engine speed, and a history of output current and output wattage of the battery 22 during traveling of the automobile 1. ECU 13 obtains such history data while the automobile 1 is traveling, and accumulates and stores the history data in the memory 18. The ECU 13 obtains the travel data regarding traveling from the memory 18.

At step ST42, the ECU 13 obtains a target output and a predicted distance in accordance with the obtained travel data of the automobile 1. The target output may be, for example, an average value of the output current of the battery 22 during traveling that is included in the travel data. The predicted distance may be, for example, an average value of the travel distance included in the travel data.

Thereafter, the ECU 13 obtains a charging state of the battery 22 at step ST43, and obtains an SOC at step ST4.

At step ST44, the ECU 13 determines whether the obtained SOC can provide predicted distance power. As used herein, the predicted distance power is power used to travel the predicted distance. The predicted distance power may be calculated based on, for example, the predicted distance and average power consumption per unit distance.

When a remaining capacity indicated by the obtained SOC is insufficient as power used to travel the predicted distance with the target output, the ECU 13 ends the processing in FIG. 10 without heating the battery 22.

When the remaining capacity indicated by the obtained SOC exceeds the power used to travel the predicted distance with the target output, the ECU 13 makes processing proceed to step ST45.

At step ST45, the ECU 13 uses the temperature selection data 71 in FIG. 9A to obtain a modified target temperature in accordance with the obtained SOC and the obtained target output.

When the target output is in a normal output range, the ECU 13 obtains a normal modified target temperature indicated with the dashed line in FIG. 9A in accordance with the obtained SOC.

When the target output is in a high output range, the ECU 13 obtains a high modified target temperature indicated with the solid line in FIG. 9A in accordance with the obtained SOC.

As used herein, the normal output range is used to travel at an averagely presumed speed and with acceleration and deceleration averagely presumed. The normal output range may be an output range preset for the vehicle irrespective of the history. Also, the high output range enables a higher output than the normal output range. The high output range may be an output range preset for the vehicle irrespective of the history.

When the travel data indicates that the automobile 1 traveled with a low output within the normal output range for the automobile 1, the ECU 13 selects and obtains a modified target temperature corresponding to the SOC from the plurality of modified target temperatures for the normal output range indicated with the dashed line in FIG. 9A.

When the travel data indicates that the automobile 1 traveled with a high output exceeding the normal output range for the automobile 1, the ECU 13 selects and obtains a modified target temperature corresponding to the SOC from the plurality of modified target temperatures for the high output range indicated with the solid line in FIG. 9A.

Thereafter, the ECU 13 sets the target temperature of the battery 22 to the modified target temperature at step ST7, and performs the heating control of the battery 22 at step ST8.

At step ST7, the ECU 13 may obtain a modified target temperature in accordance with the output range based on the history and a current SOC irrespective of the charging state and set the target temperature of the heating control of the battery 22 to the obtained modified target temperature. Alternatively, for example, when the battery 22 is on charge, the ECU 13 may obtain the highest modified target temperature selectable from the temperature selection data 71 in accordance with the output in a different manner from the case in which the battery 22 is not on charge, and set the target temperature of the heating control of the battery 22 to the highest modified target temperature. From the temperature selection data 71 of target temperatures in FIG. 9A, for example, a modified target temperature indicated with the dashed line in the normal output zone and a modified target temperature indicated with the solid line in the high output zone are selectable for the same value of SOC. When the normal output zone is insufficient and the high output zone is used to obtain the target output based on the history, the ECU 13 obtains a modified target temperature indicated with the solid line and sets the target temperature of the heating control of the battery 22 to the obtained modified target. Conversely, when the target output based on the history can be obtained in the normal output zone, the ECU 13 obtains a modified target temperature indicated with the dashed line and sets the target temperature of the heating control of the battery 22 to the obtained modified target temperature.

A heating start temperature compared with the current temperature of the battery 22 at step ST6 may be a fixed value irrespective of the SOC or the modified target temperature. Alternatively, the heating start temperature compared with the current temperature of the battery 22 at step ST6 may be a different value for each modified target temperature that is selected in accordance with the SOC as in the above-described embodiments. The heating start temperature may be a value lower than the modified target temperature by a fixed value equivalent to an allowable temperature difference.

Thus, the ECU 13 can obtain the modified target temperature, for example, for heating the battery 22 which is not on charge while the automobile 1 is stopped in accordance with the obtained remaining capacity and the obtained travel data of the automobile 1, and set the target temperature of the heating control of the battery 22 to the obtained modified target temperature.

When the automobile 1 has a history indicating that the automobile traveled with a high output on average, the ECU 13 obtains a modified target temperature higher than that when the automobile 1 has a history indicating that the automobile 1 traveled with a normal low output on average, and set the target temperature of the heating control of the battery 22 to the obtained target temperature.

As described above, according to this embodiment, the memory 18 accumulates the travel data regarding traveling of the automobile 1. The travel data is an example of the travel history of the automobile 1. Then, the ECU 13 obtains the travel data of the automobile 1. When the automobile 1 is traveling with a high output, the ECU 13 obtains a modified target temperature higher than that when the automobile 1 is traveling with a low output, and sets the target temperature of the heating control of the battery 22 to the obtained modified target temperature.

Consequently, according to this embodiment, when the automobile 1 is in an environment of traveling with a high output, for example, the battery 22 can be appropriately heated so as to obtain an output suitable for the travel environment.

Fifth Embodiment

Next, the battery heating apparatus 10 of the automobile 1 according to a fifth embodiment of the disclosure will be described. This embodiment uses a modified target temperature not only to provide an output capacity of the battery 22 but also to provide a regeneration input capacity.

In this embodiment, the same reference signs are used for configurations similar to those in the above-described embodiments, and illustration and description thereof will be omitted. The following description will focus on differences from the above-described embodiments.

FIG. 9B illustrates the temperature selection data 72 of target temperatures according to the fifth embodiment.

FIG. 9B illustrates the temperature selection data 72 on a graph of input (regeneration) capacities of the battery 22.

In the input capacity graph of the battery 22, the vertical axis represents temperature. The temperature increases from the top to the bottom of the graph.

The horizontal axis of each graph represents an SOC as a remaining capacity. The SOC increases from the left to the right of the graph.

The input capacity of the battery 22 decreases as the SOC increases and as the temperature decreases. In view of this, the input capacity of the battery 22 may be classified, for example, into zones defined by dotted lines in the graph, that is, a low regeneration zone, a normal regeneration zone, and a high regeneration zone.

The temperature selection data 72 basically includes two modified target temperatures for each SOC value, that is, a modified target temperature for high regeneration and a modified target temperature for normal regeneration. The temperature selection data 72 includes a plurality of sets of modified target temperatures corresponding to a plurality of input capacities. A plurality of modified target temperatures for high regeneration corresponding to respective SOC values are indicated with a solid line in FIG. 9B. A plurality of modified target temperatures for normal regeneration corresponding to respective SOC values are indicated with a dashed line in FIG. 9B. Each of the lines connecting the plurality of modified target temperatures is a polygonal chain having two levels. The boundary between the two levels is located on a predetermined relatively low SOC value. An SOC threshold on the boundary between the low SOC range and the high SOC range where the modified target temperature changes as indicated with the dashed line graph of the temperature selection data 72 may be slightly lower than the above-described threshold A %, for example. An SOC threshold on the boundary between the low SOC range and the high SOC range where the modified target temperature changes as indicated with the solid line graph of the temperature selection data 72 may be made lower than the threshold indicated with the dashed line. This facilitates providing a higher regeneration input.

The modified target temperatures of the temperature selection data 72 for high regeneration indicated with the solid line in FIG. 9B are higher than the modified target temperatures of the temperature selection data 72 for normal regeneration indicated with the dashed line.

When an average regeneration input to the battery 22 during traveling of the automobile 1 is high, the ECU 13 selects a higher modified target temperature indicated with the solid line in place of a modified target temperature indicated with the dashed line.

Thus, when the automobile 1 is traveling with a high regeneration input, the ECU 13 can obtain a modified target temperature higher than that when the automobile 1 is traveling with a normal low regeneration input, and set the target temperature of the heating control of the battery 22 to the obtained modified target temperature.

Then, the ECU 13 performs processing in FIG. 10 for heating control of the battery 22.

At step ST41, the ECU 13 obtains travel data of the automobile 1 as a travel history of the automobile 1. The travel data of the automobile 1 includes, for example, a history such as a travel distance by the automobile 1, a traveling speed, and an engine speed, a history of output current and output wattage of the battery 22 during traveling of the automobile 1, and a history of input current and input wattage by regeneration. The ECU 13 obtains such travel data of the automobile 1 while the automobile 1 is traveling, and accumulates and stores the obtained travel data in the memory 18. The ECU 13 obtains the travel data regarding traveling of the automobile 1 from the memory 18.

At step ST42, the ECU 13 obtains a target output, a target input, and a predicted distance in accordance with the obtained travel data of the automobile 1. The target input may be, for example, an average value of input current to the battery 22 by regeneration during traveling that is included in the travel data.

Thereafter, the ECU 13 obtains a charging state of the battery 22 at step ST43, and obtains an SOC at step ST4.

At step ST44, the ECU 13 calculates power used to travel the predicted distance, and predicts and determines whether the obtained SOC can provide the power.

When a remaining capacity indicated by the obtained SOC is insufficient as power used to travel the predicted distance with the target output, the ECU 13 ends the processing in FIG. 10 without heating the battery 22.

When the remaining capacity indicated by the obtained SOC exceeds the power used to travel the predicted distance with the target output, the ECU 13 makes processing proceed to step ST45.

At step ST45, the ECU 13 uses the temperature selection data 71 and 72 in FIGS. 9A and 9B to obtain a modified target temperature in accordance with the obtained SOC, target output, and target input.

When the target output is in the normal output range, the ECU 13 obtains a modified target temperature indicated with the dashed line in FIG. 9A in accordance with the obtained SOC.

When the target output is in the high output range, the ECU 13 obtains a modified target temperature indicated with the solid line in FIG. 9A in accordance with the obtained SOC.

When the target input is in a normal input range, the ECU 13 obtains a modified target temperature indicated with the dashed line in FIG. 9B in accordance with the obtained SOC.

When the target input is in a high input range, the ECU 13 obtains a modified target temperature indicated with the solid line in FIG. 9B in accordance with the obtained SOC.

As used herein, the normal input range is used to travel with deceleration averagely presumed. The normal input range may be a preset input range irrespective of the history. The high input range enables a higher input than the normal input range. The high output range may be a preset input range irrespective of the history.

When the travel data indicates that the automobile 1 traveled with a low output within the normal output range for the automobile 1, the ECU 13 selects and obtains a modified target temperature corresponding to the SOC from the plurality of modified target temperatures for the normal input range indicated with the dashed line in FIG. 9B.

When the travel data indicates that the automobile 1 traveled with a high output exceeding the normal output range for the automobile 1, the ECU 13 selects and obtains a modified target temperature corresponding to the SOC from the plurality of modified target temperatures for the high input range indicated with the solid line in FIG. 9B.

Then, the ECU 13 compares the modified target temperature obtained based on the target output with the modified target temperature obtained based on the target input, and obtains a higher one of the modified target temperatures as a final modified target temperature.

Thereafter, the ECU 13 sets the target temperature of the battery 22 to the modified target temperature at step ST7, and performs the heating control of the battery 22 at step ST8.

At step ST7, the ECU 13 may obtain a modified target temperature in accordance with the input range and a current SOC based on the history irrespective of the charging state and set the target temperature of the heating control of the battery 22 to the obtained modified target temperature. Alternatively, for example, when the battery 22 is on charge, the ECU 13 may obtain the highest modified target temperature selectable from the temperature selection data 72 in accordance with the input in a different manner from the case in which the battery is not on charge, and set the target temperature of the heating control of the battery 22 to the highest modified target temperature. From the temperature selection data 72 of target temperatures in FIG. 9B, for example, a modified target temperature indicated with the dashed line in the normal regeneration zone and a modified target temperature indicated with the solid line in the high regeneration zone are selectable for the same value of SOC. When the normal regeneration zone is insufficient and the high regeneration zone is used to obtain the target input based on the history, the ECU 13 obtains a modified target temperature indicated with the solid line and sets the target temperature of the heating control of the battery 22 to the obtained modified target temperature. Conversely, when the target input based on the history can be obtained from the normal regeneration zone, the ECU 13 obtains a modified target temperature indicated with the dashed line and sets the target temperature of the heating control of the battery 22 to the obtained modified target temperature. The ECU 13 may set a final modified target temperature to a higher one of the modified target temperature obtained based on the temperature selection data 71 and the modified target temperature obtained based on the temperature selection data 72.

A heating start temperature compared with the current temperature of the battery 22 at step ST6 may be a fixed value irrespective of the SOC or the modified target temperature. Alternatively, the heating start temperature compared with the current temperature of the battery 22 at step ST6 may be a different value for each modified target temperature that is selected in accordance with the SOC as in the above-described embodiments. The heating start temperature may be a value lower than the modified target temperature by a predetermined value.

Thus, the ECU 13 can obtain the modified target temperature, for example, for heating the battery 22 which is not on charge while the automobile 1 is stopped in accordance with the obtained remaining capacity and the obtained output capacity and input capacity of the battery 22, and set the target temperature of the heating control of the battery 22 to the obtained modified target temperature.

When a high regeneration input is expected, the ECU 13 obtains a modified target temperature higher than a modified target temperature obtained simply from the output capacity of the battery 22 and sets the target temperature of the heating control of the battery 22 to the obtained modified target temperature. This configuration enhances the regeneration input.

As described above, according to this embodiment, the ECU 13 obtains the history of the output of the battery 22 and the history of the regeneration input to the battery 22 as the travel history of the automobile 1, obtains, as the modified target temperature, a higher one of the target temperature obtained based on the output history of the battery 22 and the target temperature obtained based on the regeneration input history of the battery 22, and sets the target temperature of the heating control of the battery 22 to the obtained modified target temperature.

Consequently, according to this embodiment, considering not only the output of the battery 22 but also the regeneration input to the battery 22, the battery 22 can be appropriately heated to obtain performance suitable for both of the output of the battery 22 and the regeneration input to the battery 22.

Regeneration input performance of the battery 22 is basically enhanced as the temperature of the battery 22 increases. According to this embodiment, therefore, the battery 22 is heated to the temperature suitable for the regeneration input to regenerate power so effectively that increasing the travel distance is expected.

Sixth Embodiment

Next, the battery heating apparatus 10 of the automobile 1 according to a sixth embodiment of the disclosure will be described. This embodiment uses a modified target temperature in accordance with each user's travel history.

In this embodiment, the same reference signs are used for configurations similar to those in the above-described embodiments, and illustration and description thereof will be omitted. The following description will focus on differences from the above-described embodiments.

Figure 11:
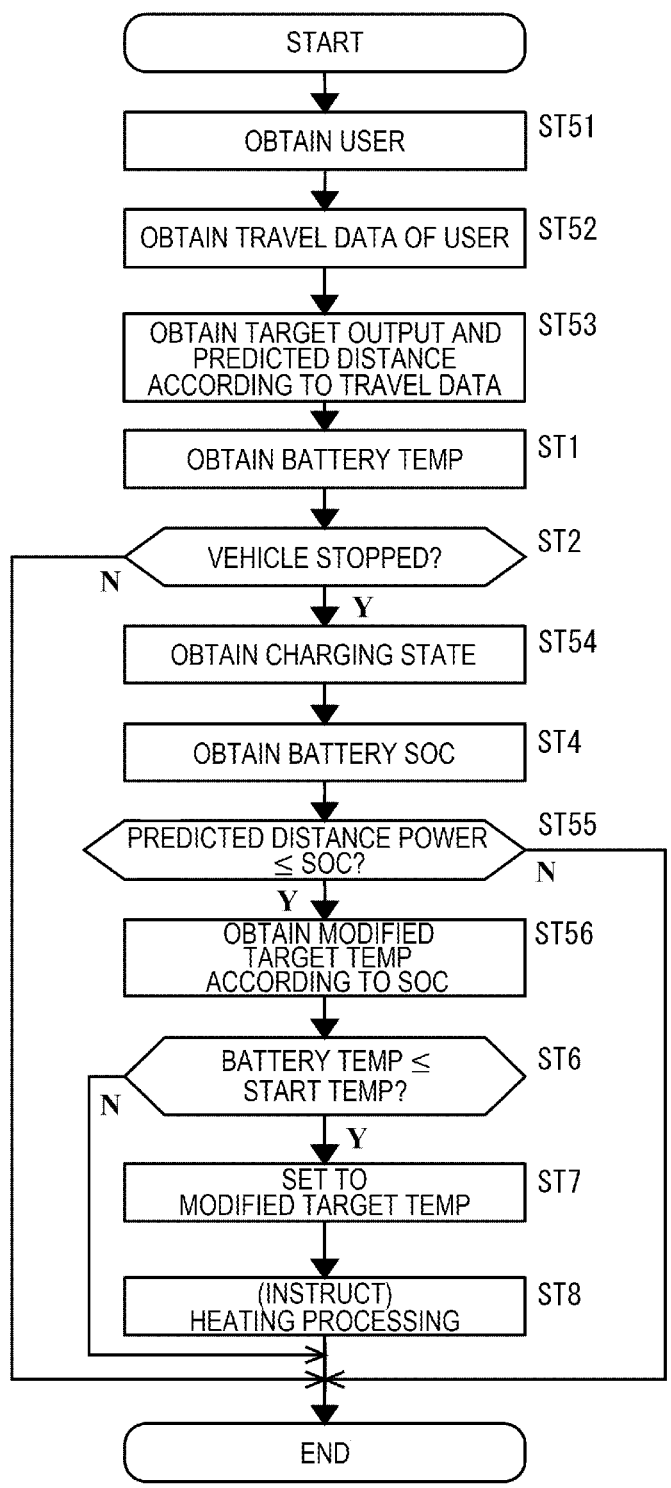
FIG. 11 is a flowchart of a procedure for heating control of the battery performed by the ECU in FIG. 2 according to a sixth embodiment.

FIG. 11 is a flowchart of a procedure for heating control of the battery 22 performed by the ECU 13 in FIG. 2 according to the sixth embodiment.

At step ST51, the ECU 13 obtains a user. The ECU 13 obtains user information from the occupant monitoring device 17 to obtain the user who is a driver that has boarded the automobile 1.

At step ST52, the ECU 13 obtains travel data of the obtained user as a travel history of the obtained user. The travel data of the obtained user includes, for example, a history such as a travel distance, a traveling speed, and an engine speed for the obtained user, and a history of output current and output wattage of the battery 22 during traveling of the automobile 1 by the obtained user. The ECU 13 obtains such travel data of the obtained user while the automobile 1 is traveling, and accumulates and stores the obtained travel data in the memory 18 in association with the obtained user. The ECU 13 obtains the travel data regarding traveling by the obtained user from the memory 18.

At step ST53, the ECU 13 obtains a target output and a predicted distance in accordance with the obtained travel data of the user.

Thereafter, the ECU 13 obtains a charging state of the battery 22 at step ST54, and obtains an SOC at step ST4.

At step ST55, the ECU 13 calculates power used to travel the predicted distance, and determines whether the obtained SOC can provide the power.

When a remaining capacity indicated by the obtained SOC is insufficient as the power used to travel the predicted distance with the target output, the ECU 13 ends the processing in FIG. 11 without heating the battery 22.

When the remaining capacity indicated by the obtained SOC exceeds the power used to travel the predicted distance with the target output, the ECU 13 makes the processing proceed to step ST56.

At step ST56, the ECU 13 uses the temperature selection data 71 in FIG. 9A to obtain a modified target temperature in accordance with the obtained SOC and the obtained target output.

When the target output is in the normal output range, the ECU 13 obtains a modified target temperature indicated with the dashed line in FIG. 9A in accordance with the obtained SOC.

When the target output is in the high output range, the ECU 13 obtains a modified target temperature indicated with the solid line in FIG. 9A in accordance with the obtained SOC.

When the travel data of the user indicates that the automobile 1 traveled with a low output within the normal output range for the automobile 1, the ECU 13 selects and obtains a modified target temperature corresponding to the SOC from the plurality of modified target temperatures for the normal output range indicated with the dashed line in FIG. 9A.

When the travel data of the user indicates that the automobile 1 traveled with a high output exceeding the normal output range for the automobile 1, the ECU 13 selects and obtains a modified target temperature corresponding to the SOC from the plurality of modified target temperatures for the high output range indicated with the solid line in FIG. 9A.

Thereafter, the ECU 13 sets the target temperature of the battery 22 to the modified target temperature at step ST7, and performs the heating control of the battery 22 at step ST8.

Thus, in accordance with the obtained remaining capacity and the travel history of each user, the ECU 13 can obtain and set, for example, the target temperature for heating the battery 22 which is not on charge while the automobile 1 is stopped.

When the travel data of the obtained user includes a history of traveling with a high output on average, the ECU 13 obtains a modified target temperature higher than that in the case in which the travel data of the obtained user include a history of traveling with a normal low output on average, and sets the target temperature of the heating control of the battery 22 to the obtained modified target temperature.

As described above, according to this embodiment, a user identifying device identifies the user that has boarded the automobile 1. In some embodiments, the occupant monitoring device 17 serves as the user identifying device. Then, the ECU 13 obtains the travel data of the identified user as a driver. When the identified user is driving the automobile 1 to travel with a high output, the ECU 13 obtains a modified target temperature higher than that in the case in which the user drives the automobile 1 to travel with a low output, and sets the target temperature of the heating control of the battery 22 to the obtained modified target temperature.

Consequently, according to this embodiment, when the driver is apt to drive the automobile 1 to travel with a high output, the battery 22 can be appropriately heated to provide an output suitable for the driver.

Seventh Embodiment

Next, the battery heating apparatus 10 of the automobile 1 according to a seventh embodiment of the disclosure will be described. This embodiment uses a modified target temperature in accordance with an operation environment of the automobile 1.

In this embodiment, the same reference signs are used for configurations similar to those in the above-described embodiments, and illustration and description thereof will be omitted. The following description will focus on differences from the above-described embodiments.

Figure 12:
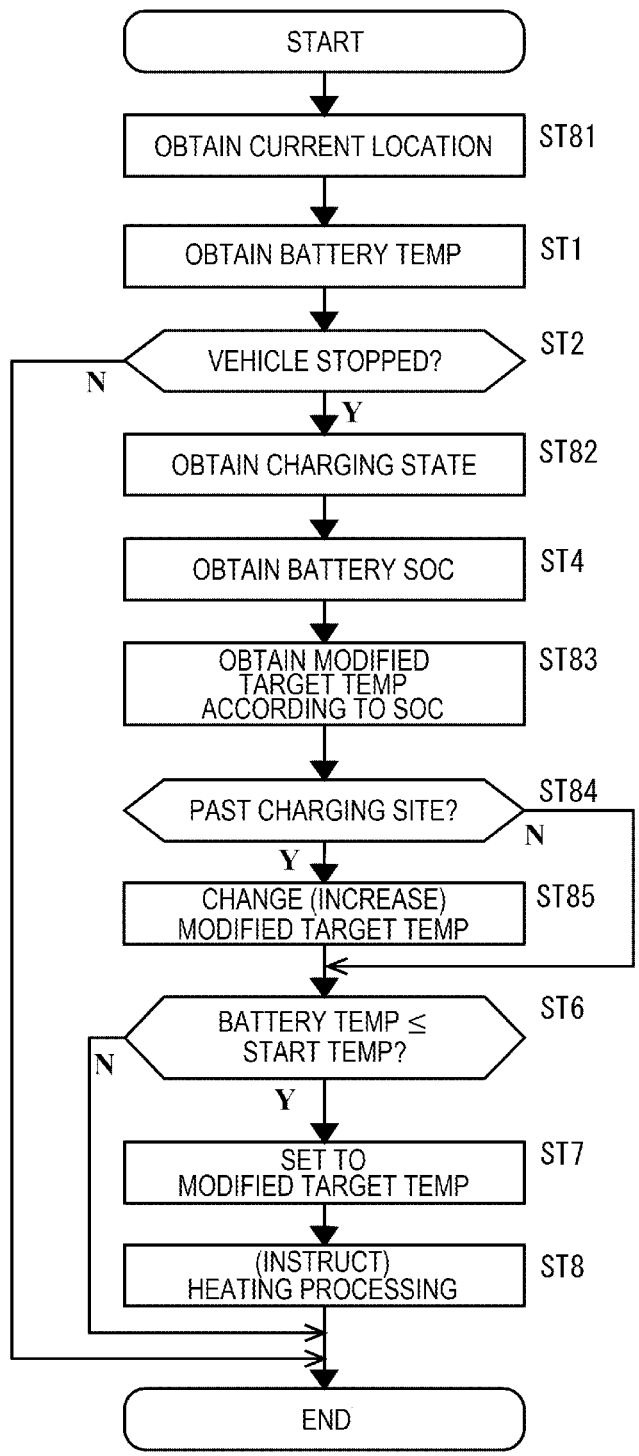
FIG. 12 is a flowchart of a procedure for heating control of the battery performed by the ECU in FIG. 2 according to a seventh embodiment.

FIG. 12 is a flowchart of a procedure for heating control of the battery 22 performed by the ECU 13 in FIG. 2 according to the seventh embodiment.

At step ST81, the ECU 13 obtains a current location of the automobile 1 as the operation environment of the automobile 1. The ECU 13 obtains the latest position information of the automobile 1 from the receiver 16 to obtain the current location of the automobile 1.

Thereafter, the ECU 13 obtains a charging state of the battery 22 at step ST82, and obtains an SOC at step ST4.

At step ST83, the ECU 13 uses the temperature selection data 61 in FIGS. 7A and 7B to obtain a modified target temperature in accordance with the obtained SOC and a target output.

At step ST84, the ECU 13 determines whether the current location is a past charging site where the battery 22 was charged in the past. The ECU 13 may obtain current locations in the past from the receiver 16 during past charging, and accumulate and store the current locations in the past in the memory 18 as past charging sites. The ECU 13 may determine whether the current location coincides with any of the charging sites accumulated in the memory 18 to determine whether the current location is a past charging site.

When the current location is a past charging site, the ECU 13 makes processing proceed to step ST85.

When the current location is not a past charging site, the ECU 13 makes processing proceed to step ST6.

At step ST85, the ECU 13 updates and increases the modified target temperature obtained at step ST83 by a predetermined temperature. Thus, the modified target temperature is increased to improve the output capacity of the battery 22 accordingly.

When the current location is a site at which the battery 22 was charged, the ECU 13 chooses a modified target temperature higher than the obtained modified target temperature irrespective of the charging history of the current location.

Thereafter, the ECU 13 sets the target temperature of the battery 22 to the modified target temperature at step ST7, and performs the heating control of the battery 22 at step ST8.

Thus, in accordance with the obtained remaining capacity and charging history, the ECU 13 can obtain and set, for example, the target temperature for heating the battery 22 which is not on charge while the automobile 1 is stopped.

When the current location is a site at which the battery 22 was charged, the ECU 13 obtains a modified target temperature higher than that in the case in which a site at which the battery 22 has not been charged, and set the target temperature of the heating control of the battery 22 to the obtained modified target temperature.

As described above, according to this embodiment, the receiver 16 detects the current location of the automobile 1. In some embodiments, the receiver 16 serves as a current location detector. The memory 18 stores the charging history indicating past charging sites. Then, the ECU 13 obtains the current location as the operation environment of the automobile 1. When the current location is a site in the charging history, the ECU 13 obtains a temperature higher than the modified target temperature when the current location is a site at which the battery 22 has not been charged, and set the target temperature of the heating control of the battery 22 to the obtained temperature. When the current location is a site at which the battery 22 was charged, charging in the current location enables increasing the remaining capacity to prevent traveling thereafter from being limited by the remaining capacity at the moment.

According to this embodiment, therefore, when the charging history indicates that charging may be performed instantaneously, the battery 22 can be appropriately heated to a high target temperature to obtain more favorable performance of the battery 22 without being limited by the remaining capacity of the battery 22 as in the case of a site at which the battery 22 has not been charged.

Eighth Embodiment

Next, the battery heating apparatus 10 of the automobile 1 according to an eighth embodiment of the disclosure will be described. This embodiment uses a modified target temperature in accordance with a road surface situation of a road on which the automobile 1 is planned to travel.

In this embodiment, the same reference signs are used for configurations similar to those in the above-described embodiments, and illustration and description thereof will be omitted. The following description will focus on differences from the above-described embodiments.

Figure 13:
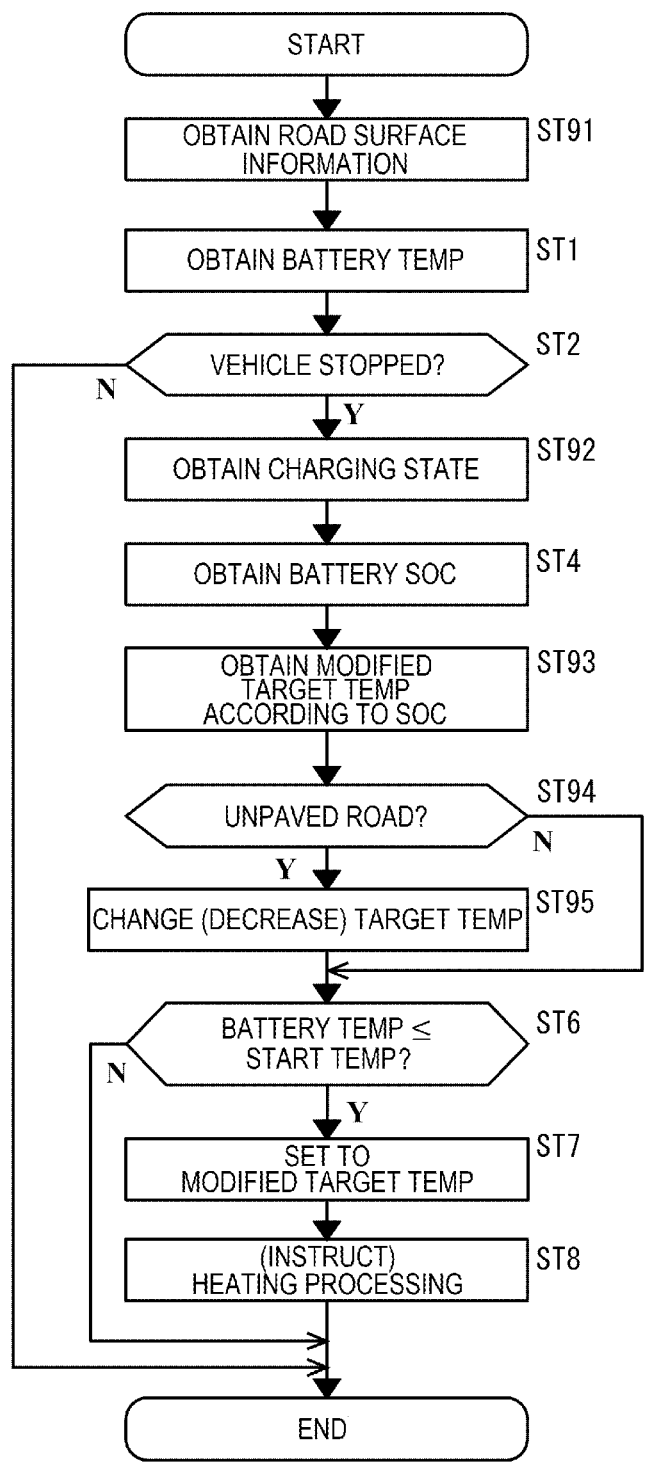
FIG. 13 is a flowchart of a procedure for heating control of the battery performed by the ECU in FIG. 2 according to an eighth embodiment.

FIG. 13 is a flowchart of a procedure for heating control of the battery 22 performed by the ECU 13 in FIG. 2 according to the eighth embodiment.

At step ST91, the ECU 13 obtains information on a road surface on which the automobile 1 is planned to travel. The ECU 13 obtains the information on the road surface on which the automobile 1 is planned to travel, for example, from the receiver 16.

Thereafter, the ECU 13 obtains a charging state of the battery 22 at step ST92, and obtains an SOC at step ST4.

At step ST93, the ECU 13 uses the temperature selection data 61 in FIGS. 7A and 7B to obtain a modified target temperature in accordance with the obtained SOC and a target output.

At step ST94, the ECU 13 determines whether the road surface on which the automobile 1 is planned to travel is an unpaved road that is more slippery than a normal paved road.

When the road surface on which the vehicle 1 is planned to travel is not an unpaved road, the ECU 13 makes processing proceed to step ST6.

When the road surface on which the vehicle 1 is planned to travel is an unpaved road, the ECU 13 makes processing proceed to step ST95.

At step ST95, the ECU 13 updates and decreases the modified target temperature obtained at step ST93 by a predetermined temperature. Thus, the modified target temperature is decreased to lower the output capacity of the battery 22 accordingly.

When predicting that the road surface on which the vehicle 1 is planned to travel is more slippery than a normal paved road, the ECU 13 chooses a modified target temperature lower than the obtained modified target temperature irrespective of the situation of the road surface on which the vehicle 1 is planned to travel.

Thereafter, the ECU 13 sets the target temperature of the battery 22 to the modified target temperature at step ST7, and performs the heating control of the battery 22 at step ST8.

Thus, in accordance with the obtained remaining capacity and road surface situation, the ECU 13 can obtain and set, for example, the target temperature for heating the battery 22 which is not on charge while the automobile 1 is stopped.

When the road surface on which the automobile 1 is planned to travel is a road surface of a slippery unpaved road on which the automobile 1 does not use a high output, the ECU 13 obtains a modified target temperature by lowering a modified target temperature for a road surface of a normal paved road or of a road less slippery than the normal paved road, and sets the target temperature of the heating control of the battery 22 to the obtained modified target temperature.

As described above, according to this embodiment, the receiver 16 as the road surface detector obtains the information on the road surface on which the automobile 1 is planned to travel. Then, the ECU 13 obtains the information on the road surface on which the automobile 1 is planned to travel from the receiver 16. When the road surface on which the automobile 1 is planned to travel is more slippery than a normal paved road, the ECU 13 obtains the modified target temperature lower than that in the case of a road surface of a paved road or of a road less slippery than the paved road, and sets the target temperature of the heating control of the battery 22 to the obtained modified target temperature. Even when a low temperature of the battery 22 causes the peak power of the battery 22 to be accordingly low, a slippery road surface is less likely to substantially affect traveling.

According to this embodiment, therefore, when the road surface on which the automobile 1 is planned to travel is more slippery than a paved road and a high output of the battery is not used in consequence, the battery 22 can be appropriately heated to a correspondingly low target temperature.

Ninth Embodiment

Next, the battery heating apparatus 10 of the automobile 1 according to a ninth embodiment of the disclosure will be described. According to this embodiment, heating of the battery 22 is started and continued when a user approves.

In this embodiment, the same reference signs are used for configurations similar to those in the above-described embodiments, and illustration and description thereof will be omitted. The following description will focus on differences from the above-described embodiments.

Figure 14:
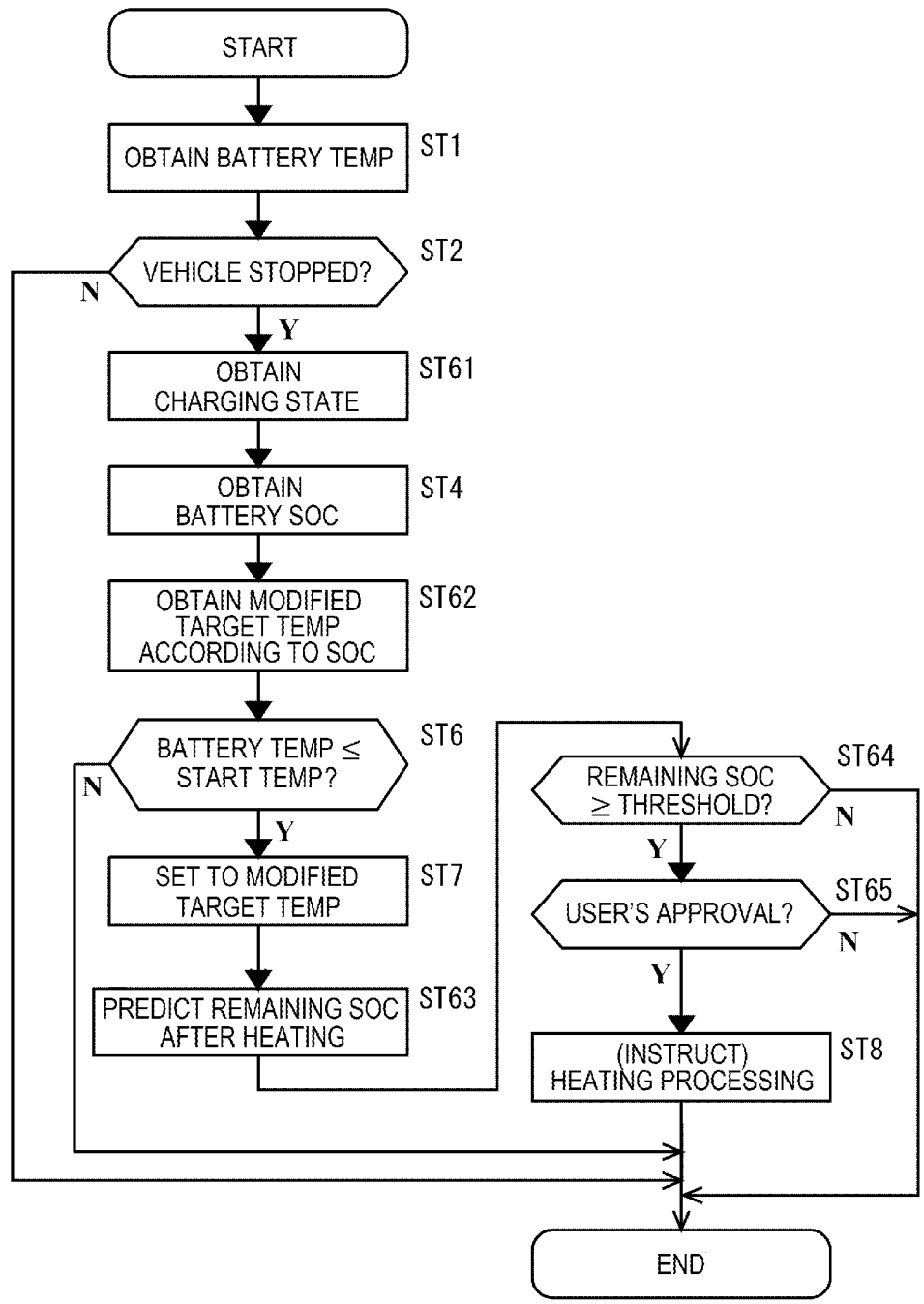
FIG. 14 is a flowchart of a procedure for heating control of the battery performed by the ECU in FIG. 2 according to a ninth embodiment.

FIG. 14 is a flowchart of a procedure for heating control of the battery 22 performed by the ECU 13 in FIG. 2 according to the ninth embodiment.

After determining that the automobile 1 is stopped at step ST2, the ECU 13 obtains a charging state of the battery 22 at step ST61, and obtains an SOC at step ST4.

At step ST62, the ECU 13 uses the temperature selection data 61 in FIGS. 7A and 7B to obtain a modified target temperature in accordance with the obtained SOC and a target output.

Thereafter, at step ST7, the ECU 13 sets a target temperature of the battery 22 to the modified target temperature.

At step ST63, the ECU 13 predicts an SOC indicating a remaining capacity of the battery 22 after heating the battery 22. For example, the ECU 13 subtracts an amount of power consumed by a single event of heating in the past from the obtained SOC to obtain the SOC remaining after heating.

At step ST64, the ECU 13 determines whether the SOC remaining after heating is equal to or more than a predetermined threshold. The predetermined threshold may be, for example, an SOC corresponding to an amount of power consumed by normal traveling. Alternatively, the predetermined threshold may be, for example, an SOC corresponding to an amount of power consumed by traveling predicted based on the user's schedule.

When the SOC remaining after heating is not equal to or more than the predetermined threshold, the ECU 13 ends the processing in FIG. 14 without performing the heating control of the battery 22.

When the SOC remaining after heating is equal to or more than the predetermined threshold, the ECU 13 makes processing proceed to step ST65.

At step ST65, the ECU 13 determines as to whether the user approves a start of heating the battery 22. The ECU 13 displays, on the display 19 of the user interface 21, that heating the battery 22 is to be started, to make a notification to the user. Based on an operation of the operation unit 20 in response to the notification, the ECU 13 determines as to whether the user approves.

When the user does not approve the start of the heating, the ECU 13 ends the processing in FIG. 14 without performing the heating control of the battery 22.

When the user approves the start of the heating, the ECU 13 makes the processing proceed to step ST8.

At step ST8, the ECU 13 performs the heating control of the battery 22.

Thus, in accordance with the obtained remaining capacity and the user approval to the start of the heating, the ECU 13 can obtain and set, for example, the target temperature for heating the battery 22 which is not on charge while the automobile 1 is stopped.

The ECU 13 controls the start of the heating of the battery 22 by the heater 15 in accordance with the user's operation on the user interface 21.

Figure 15:
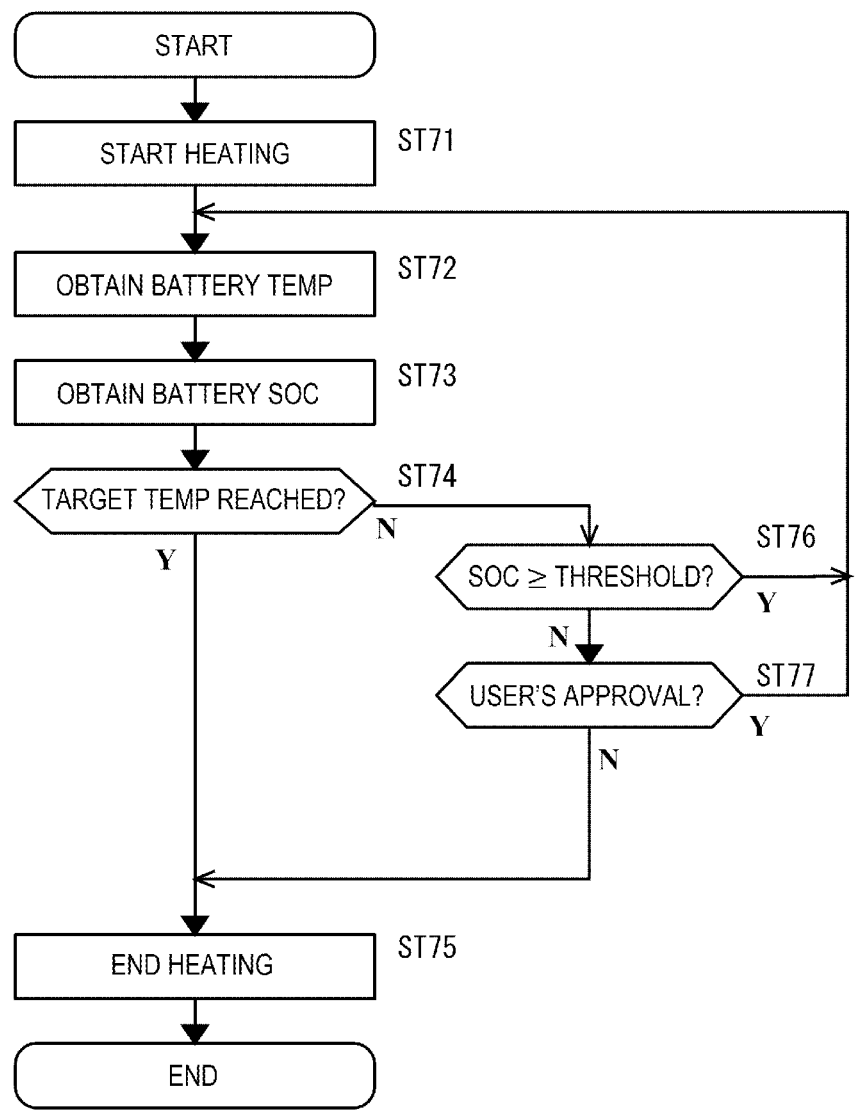
FIG. 15 is a flowchart of a procedure for heating control of the battery performed by the ECU in FIG. 2 according to the ninth embodiment.

FIG. 15 is a flowchart of a procedure for heating control of the battery 22 performed by the ECU 13 in FIG. 2 according to the ninth embodiment.

At step ST8 in FIG. 14, for example, the ECU 13 performs the heating control of the battery 22 in FIG. 15.

At step ST71, the ECU 13 starts heating the battery 22. At step ST72, the ECU 13 obtains a temperature of the battery 22 being heated.

At step ST73, the ECU 13 obtains an SOC of the battery 22 being heated.

At step ST74, the ECU 13 determines whether the current temperature of the battery 22 being heated has reached a modified target temperature.

When the temperature of the battery 22 being heated has reached the modified target temperature, the ECU 13 makes processing proceed to step ST75.

When the temperature of the battery 22 being heated has not reached the modified target temperature, the ECU 13 makes processing proceed to step ST76.

At step ST76, the ECU 13 determines whether the SOC of the battery 22 being heated is equal to or more than a predetermined threshold. As used herein, the predetermined threshold may be the same as the threshold at step ST64.

When the SOC of the battery 22 being heated is equal to or more than the predetermined threshold, the ECU 13 returns the processing to step ST72. This causes the heating of the battery 22 to continue.

When the SOC of the battery 22 being heated is not equal to or more than the predetermined threshold, the ECU 13 makes the processing proceed to step ST77.

At step ST77, the ECU 13 determines as to whether the user approves continuation of heating the battery 22. The ECU 13 displays, on the display 19 of the user interface 21, that the heating of the battery 22 is to be continued, so as to make a notification to the user. Based on an operation of the operation unit 20 in response to the notification, the ECU 13 determines as to whether the user approves.

When the user approves the continuation of the heating, the ECU 13 returns the processing to step ST72. This causes the heating of the battery 22 to continue.

When the user does not approve the continuation of the heating, the ECU 13 makes the processing proceed to step ST75.

At step ST75, the ECU 13 stops heating the battery 22.

Thus, the ECU 13 can control continuation of heating the battery 22 in accordance with the user's approval during heating.

As described above, according to this embodiment, the user interface 21 is operated by the user to determine whether to heat the battery 22.

Then, the ECU 13 controls the start of the heating of the battery 22 by the heater 15 and stop by interrupting the heating in accordance with the user's operation on the user interface 21 regarding heating.

According to this embodiment, therefore, when the user considers that heating the battery 22 is unnecessary, starting and continuing to heat the battery 22 can be stopped.

The embodiments in the foregoing are examples of the disclosure. It is noted that the disclosure is not limited to these embodiments. Various modifications and changes may be made to the embodiments without departing from the sprit and scope of the disclosure.

For example, in each of the above-described embodiments, the ECU 13 selects a modified target temperature in accordance with a corresponding one of the degradation state regarding the current output capacity or regeneration input capacity of the battery 22, the travel history of the automobile 1, the current operation environment (current location), and the situation of the road surface on which the vehicle 1 is planned to travel.

Alternatively, for example, the ECU 13 may select the modified target temperature in accordance with at least two parameters from the group consisting of the degradation state of the battery 22, the travel history of the automobile 1, the current operation environment (current location), and the situation of the road surface on which the automobile 1 is planned to travel.

In this case, in accordance with the obtained SOC and one or more of the parameters described above, the ECU 13 obtains and sets the modified target temperature, for example, for heating the battery 22 which is not on charge while the automobile 1 is stopped.

According to the embodiments of the disclosure, a controller obtains a remaining capacity of a battery, and sets a target temperature for heating the battery which is not on charge while a vehicle is stopped in accordance with the obtained remaining capacity. When the obtained remaining capacity is low, for example, the controller sets the target temperature for heating the battery which is not on charge while the vehicle is stopped to a target temperature lower than a target temperature when the remaining capacity is high. Then, a heater heats the battery to the set target temperature. Alternatively, the controller does not heat the battery using the heater. Thus, a temperature difference by which the battery is heated can be decreased to reduce power consumption in a single heating event.

As a result, according to at least one of the embodiments of the disclosure, in the vehicle such as an automobile, the onboard battery can be appropriately heated, and also, the remaining capacity of the battery can be prevented from being decreased by heating by the heater.

The invention claimed is:

1. A vehicle battery heating apparatus to be mounted in a vehicle that travels with electricity from a battery, the apparatus comprising:
a battery mountable in the vehicle to allow the vehicle to travel;
a heater configured to heat the battery;
a sensor configured to obtain a temperature of the battery;
a controller configured to heat the battery with the heater; and
a memory configured to store information indicating a relationship between heating target temperatures and remaining capacities of the battery, wherein
the controller is configured to
obtain a remaining capacity of the battery,
obtain a target temperature from the memory in accordance with the obtained remaining capacity based on the information, and
set a target temperature for heating the battery which is not on charge while the vehicle is stopped to the obtained target temperature, and
the heater is configured to heat the battery to the set target temperature, wherein
the information includes a first information and a second information, the first information indicates that the target temperature when the remaining capacity is lower than a first remaining capacity threshold is a first target temperature, and the second information indicates that the target temperature when the remaining capacity is equal to or higher than the first remaining capacity threshold is a second target temperature which is higher than the first target temperature, and
the controller is configured to
execute a first heating process to heat the battery to the first target temperature using the heater, when the vehicle is stopped, the battery is not on charge, the obtained remaining capacity is lower than the first remaining capacity threshold, and the obtained temperature is lower than the first target temperature, and
execute a second heating process to heat the battery to the second target temperature using the heater, when the vehicle is stopped, the battery is not on charge, the obtained remaining capacity is equal to or higher than the first remaining capacity threshold, and the obtained temperature is lower than the second target temperature.

2. The vehicle battery heating apparatus according to claim 1, further comprising:
a degradation sensor configured to determine a degradation state of the battery, wherein
the information includes a third information and a fourth information, the third information indicates that the target temperature when the remaining capacity is lower than the first remaining capacity threshold is a third target temperature which is higher than the first target temperature, and the fourth information indicates that the target temperature when the remaining capacity is equal to or higher than the first remaining capacity threshold is a fourth target temperature which is higher than the second target temperature, and
the controller is configured to
obtain the degradation state of the battery,
execute the first heating process, when the battery is not degraded, the vehicle is stopped, the battery is not on charge, the obtained remaining capacity is lower than the first remaining capacity threshold, and the obtained temperature is lower than the first target temperature,
execute the second heating process, when the battery is not degraded, the vehicle is stopped, the battery is not on charge, the obtained remaining capacity is equal to or higher than the first remaining capacity threshold, and the obtained temperature is lower than the second target temperature,
execute a third process to heat the battery to the third target temperature using the heater, when the battery is degraded, the vehicle is stopped, the battery is not on charge, the obtained remaining capacity is lower than the first remaining capacity threshold, and the obtained temperature is lower than the third target temperature, and
execute a fourth heating process to heat the battery to the fourth target temperature using the heater, when the battery is degraded, the vehicle is stopped, the battery is not on charge, the obtained remaining capacity is equal to or higher than the first remaining capacity threshold, and the obtained temperature is lower than the fourth target temperature.

3. The vehicle battery heating apparatus according to claim 1, further comprising:
a degradation sensor configured to determine a degradation state of the battery, wherein
the information includes a third information and a fourth information, the third information indicates that the target temperature when the remaining capacity is lower than a second remaining capacity threshold is a third target temperature which is higher than the first target temperature, and the fourth information indicates that the target temperature when the remaining capacity is equal to or higher than the second remaining capacity threshold is a fourth target temperature which is higher than the second target temperature, wherein the second remaining capacity threshold is lower than the first remaining capacity threshold, and
the controller is configured to
obtain the degradation state of the battery,
execute the first heating process, when the battery is not degraded, the vehicle is stopped, the battery is not on charge, the obtained remaining capacity is lower than the first remaining capacity threshold, and the obtained temperature is lower than the first target temperature,
execute the second heating process, when the battery is not degraded, the vehicle is stopped, the battery is not on charge, the obtained remaining capacity is equal to or higher than the first remaining capacity threshold, and the obtained temperature is lower than the second target temperature,
execute a third process to heat the battery to the third target temperature using the heater, when the battery is degraded, the vehicle is stopped, the battery is not on charge, the obtained remaining capacity is lower than the second remaining capacity threshold, and the obtained temperature is lower than the third target temperature, and
execute a fourth heating process to heat the battery to the fourth target temperature using the heater, when the battery is degraded, the vehicle is stopped, the battery is not on charge, the obtained raining capacity is equal to or higher than the second remaining capacity threshold, and the obtained temperature is lower than the fourth target temperature.

4. The vehicle battery heating apparatus according to claim 1, wherein
the information includes a third information and a fourth information, the third information indicates that the target temperature when the remaining capacity is lower than the first remaining capacity threshold is a third target temperature which is higher than the first target temperature, and the fourth information indicates that the target temperature when the remaining capacity is equal to or higher than the first remaining capacity threshold is a fourth target temperature which is higher than the second target temperature, and the controller is configured to
obtain a travel history of the vehicle,
obtain an average output of the battery during the vehicle traveling based on the obtained travel history,
execute the first heating process, when the obtained average output is lower than an output threshold, the vehicle is stopped, the battery is not on charge, the obtained remaining capacity is lower than the first remaining capacity threshold, and the obtained temperature is lower than the first target temperature,
execute the second heating process, when the obtained average output is lower than the output threshold, the vehicle is stopped, the battery is not on charge, the obtained remaining capacity is equal to or higher than the first remaining capacity threshold, and the obtained temperature is lower than the second target temperature,
execute a third process to heat the battery to the third target temperature using the heater, when the obtained average output is equal to or higher than the output threshold, the vehicle is stopped, the battery is not on charge, the obtained remaining capacity is lower than the first remaining capacity threshold, and the obtained temperature is lower than the third target temperature, and
execute a fourth heating process to heat the battery to the fourth target temperature using the heater, when the obtained average output is equal to or higher than the output threshold, the vehicle is stopped, the battery is not on charge, the obtained remaining capacity is equal to or higher than the first remaining capacity threshold, and the obtained temperature is lower than the fourth target temperature.

5. The vehicle battery heating apparatus according to claim 1, wherein
the information includes a third information and a fourth information, the third information indicates that the target temperature when the remaining capacity is lower than a second remaining capacity threshold is a third target temperature which is higher than the first target temperature, and the fourth information indicates that the target temperature when the remaining capacity is equal to or higher than the second remaining capacity threshold is a fourth target temperature which is higher than the second target temperature, wherein the second remaining capacity threshold is lower than the first remaining capacity threshold, and
the controller is configured to
obtain a travel history of the vehicle,
obtain an average output of the battery during the vehicle traveling based on the obtained travel history,
execute the first heating process, when the obtained average output is lower than an output threshold, the vehicle is stopped, the battery is not on charge, the obtained remaining capacity is lower than the first remaining capacity threshold, and the obtained temperature is lower than the first target temperature,
execute the second heating process, when the obtained average output is lower than the output threshold, the vehicle is stopped, the battery is not on charge, the obtained remaining capacity is equal to or higher than the first remaining capacity threshold, and the obtained temperature is lower than the second target temperature,
execute a third process to heat the battery to the third target temperature using the heater, when the obtained average output is equal to or higher than the output threshold, the vehicle is stopped, the battery is not on charge, the obtained remaining capacity is lower than the second remaining capacity threshold, and the obtained temperature is lower than the third target temperature, and execute a fourth heating process to heat the battery to the fourth target temperature using the heater, when the obtained average output is equal to or higher than the output threshold, the vehicle is stopped, the battery is not on charge, the obtained remaining capacity is equal to or higher than the second remaining capacity threshold, and the obtained temperature is lower than the fourth target temperature.

6. The vehicle battery heating apparatus according to claim 1, wherein
the information includes a third information and a fourth information, the third information indicates that the target temperature when the remaining capacity is lower than the first remaining capacity threshold is a third target temperature which is higher than the first target temperature, and the fourth information indicates that the target temperature when the remaining capacity is equal to or higher than the first remaining capacity threshold is a fourth target temperature which is higher than the second target temperature, and
the controller is configured to
obtain a current location of the vehicle as an operation environment of the vehicle,
determine whether a current location of the vehicle is a past charging site where the battery was charged,
execute the first heating process, when the current location is not the past charging site, the vehicle is stopped, the battery is not on charge, the obtained remaining capacity is lower than the first remaining capacity threshold, and the obtained temperature is lower than the first target temperature,
execute the second heating process, when the current location is not the past charging site, the vehicle is stopped, the battery is not on charge, the obtained remaining capacity is equal to or higher than the first remaining capacity threshold, and the obtained temperature is lower than the second target temperature,
execute a third process to heat the battery to the third target temperature using the heater, when the current location is the past charging site, the vehicle is stopped, the battery is not on charge, the obtained remaining capacity is lower than the first remaining capacity threshold, and the obtained temperature is lower than the third target temperature, and
execute a fourth heating process to heat the battery to the fourth target temperature using the heater, when the current location is the past charging site, the vehicle is stopped, the battery is not on charge, the obtained remaining capacity is equal to or higher than the first remaining capacity threshold, and the obtained temperature is lower than the fourth target temperature.

7. The vehicle battery heating apparatus according to claim 1, wherein
the information includes a third information and a fourth information, the third information indicates that the target temperature when the remaining capacity is lower than the first remaining capacity threshold is a third target temperature which is lower than the first target temperature, and the fourth information indicates that the target temperature when the remaining capacity is equal to or higher than the first remaining capacity threshold is a fourth target temperature which is lower than the second target temperature, and
the controller is configured to
obtain information on a road surface on which the vehicle travels,
determine whether a road surface on which the vehicle travels is slippery,
execute the first heating process, when the road surface is not slippery, the vehicle is stopped, the battery is not on charge, the obtained remaining capacity is lower than the first remaining capacity threshold, and the obtained temperature is lower than the first target temperature,
execute the second heating process, when the road surface is not slippery, the vehicle is stopped, the battery is not on charge, the obtained remaining capacity is equal to or higher than the first remaining capacity threshold, and the obtained temperature is lower than the second target temperature,
execute a third process to heat the battery to the third target temperature using the heater, when the road surface is slippery, the vehicle is stopped, the battery is not on charge, the obtained remaining capacity is lower than the first remaining capacity threshold, and the obtained temperature is lower than the third target temperature, and
execute a fourth heating process to heat the battery to the fourth target temperature using the heater, when the road surface is slippery, the vehicle is stopped, the battery is not on charge, the obtained remaining capacity is equal to or higher than the first remaining capacity threshold, and the obtained temperature is lower than the fourth target temperature.

8. The vehicle battery heating apparatus according to claim 1, further comprising:
a user interface configured to receive a user's operation to determine whether to heat the battery, wherein the controller is configured to control a start and a stop of heating the battery with the heater in accordance with the user's operation on the user interface.

9. The vehicle battery heating apparatus according to claim 1, wherein the information includes
a third information and a fourth information, the third information indicates that the target temperature when the remaining capacity is lower than the first remaining capacity threshold is a third target temperature which is higher than the first target temperature, and the fourth information indicates that the target temperature when the remaining capacity is equal to or higher than the first remaining capacity threshold is a fourth target temperature which is higher than the second target temperature, and
the controller is configured to
obtain a travel history of the vehicle,
obtain an average regeneration input to the battery during the vehicle traveling based on the obtained travel history,
execute the first heating process, when the obtained regeneration input is lower than an input threshold, the vehicle is stopped, the battery is not on charge, the obtained remaining capacity is lower than the first remaining capacity threshold, and the obtained temperature is lower than the first target temperature,
execute the second heating process, when the obtained regeneration input is lower than the input threshold, the vehicle is stopped, the battery is not on charge, the obtained remaining capacity is equal to or higher than the first remaining capacity threshold, and the obtained temperature is lower than the second target temperature,
execute a third process to heat the battery to the third target temperature using the heater, when the obtained regeneration input is equal to or higher than the input threshold, the vehicle is stopped, the battery is not on charge, the obtained remaining capacity is lower than the first remaining capacity threshold, and the obtained temperature is lower than the third target temperature, and execute a fourth heating process to heat the battery to the fourth target temperature using the heater, when the obtained regeneration input is equal to or higher than the input threshold, the vehicle is stopped, the battery is not on charge, the obtained remaining capacity is equal to or higher than the first remaining capacity threshold, and the obtained temperature is lower than the fourth target temperature.

10. The vehicle battery heating apparatus according to claim 1, wherein the information includes a third information and a fourth information, the third information indicates that the target temperature when the remaining capacity is lower than a second remaining capacity threshold is a third target temperature which is higher than the first target temperature, and the fourth information indicates that the target temperature when the remaining capacity is equal to or higher than the second remaining capacity threshold is a fourth target temperature which is higher than the second target temperature, wherein the second remaining capacity threshold is lower than the first remaining capacity threshold, and the controller is configured to obtain a travel history of the vehicle, obtain an average regeneration input to the battery during the vehicle traveling based on the obtained travel history, execute the first heating process, when the obtained regeneration input is lower than an input threshold, the vehicle is stopped, the battery is not on charge, the obtained remaining capacity is lower than the first remaining capacity threshold, and the obtained temperature is lower than the first target temperature, execute the second heating process, when the obtained regeneration input is lower than the input threshold, the vehicle is stopped, the battery is not on charge, the obtained remaining capacity is equal to or higher than the first remaining capacity threshold, and the obtained temperature is lower than the second target temperature, execute a third process to heat the battery to the third target temperature using the heater, when the obtained regeneration input is equal to or higher than the input threshold, the vehicle is stopped, the battery is not on charge, the obtained remaining capacity is lower than the second remaining capacity threshold, and the obtained temperature is lower than the third target temperature, and execute a fourth heating process to heat the battery to the fourth target temperature using the heater, when the obtained regeneration input is equal to or higher than the input threshold, the vehicle is stopped, the battery is not on charge, the obtained remaining capacity is equal to or higher than the second remaining capacity threshold, and the obtained temperature is lower than the fourth target temperature.

11. A vehicle battery heating apparatus to be mounted in a vehicle that travels with electricity from a battery, the apparatus comprising:

a battery mountable in the vehicle to allow the vehicle to travel;

a heater configured to heat the battery;

a sensor configured to obtain a temperature of the battery;

a controller configured to heat the battery with the heater; and a memory configured to store information indicating a relationship between heating target temperatures and remaining capacities of the battery, wherein the controller is configured to obtain a remaining capacity of the battery, obtain a target temperature from the memory in accordance with the obtained remaining capacity based on the information, set a target temperature for heating the batter which is not on charge while the vehicle is stopped to the obtained target temperature, and the heater is configured to heat the battery to the set target temperature, and an occupant identifying device configure to identify an occupant who has boarded the vehicle, wherein the controller is configured to obtain a travel history of the vehicle operated by the identified occupant, and when the travel history of the identified occupant indicates that the vehicle traveled with a high output exceeding the normal output range for the vehicle, the controller sets the target temperature for heating the battery which is not on charge while the vehicle is stopped to a target temperature higher than a target temperature when the vehicle traveled with a low output within the normal output range for the vehicle.

12. The vehicle battery heating apparatus according to claim 11, wherein the controller is configured to obtain, as the travel history of the vehicle, an output history and an input history of the battery that vary in accordance with the temperature of the battery, and set a target temperature to a higher one of a target temperature obtained on a basis of the output history of the battery and a target temperature obtained on a basis of the input history of the battery.

* * * * *